(12) United States Patent
Sugawara

(10) Patent No.: US 11,388,309 B2
(45) Date of Patent: Jul. 12, 2022

(54) COMMUNICATION JOB RECORD DISPLAY DEVICE, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventor: Kazuhiro Sugawara, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/601,934

(22) Filed: Oct. 15, 2019

(65) Prior Publication Data

US 2020/0137260 A1   Apr. 30, 2020

(30) Foreign Application Priority Data

Oct. 26, 2018   (JP) .............................. JP2018-201955

(51) Int. Cl.
*H04N 1/00*   (2006.01)
*H04N 1/32*   (2006.01)

(52) U.S. Cl.
CPC ..... *H04N 1/32096* (2013.01); *H04N 1/00212* (2013.01); *H04N 1/00408* (2013.01)

(58) Field of Classification Search
CPC ........... H04N 1/32096; H04N 1/00408; H04N 1/00212
See application file for complete search history.

(56) References Cited

U.S. PATENT DOCUMENTS

| 9,288,348 | B2 | 3/2016 | Maekawa | |
| 2008/0005087 | A1* | 1/2008 | Sato | G06F 12/0862 |
| 2008/0306972 | A1* | 12/2008 | Wilkin | H04L 51/066 |
| 2014/0068502 | A1* | 3/2014 | Tomiyasu | G06F 3/0485 |
| | | | | 715/784 |
| 2015/0195241 | A1* | 7/2015 | Haitani | G06F 3/0482 |
| | | | | 715/752 |
| 2017/0094073 | A1* | 3/2017 | Watanabe | H04N 1/32128 |

FOREIGN PATENT DOCUMENTS

JP   2015019291 A   1/2015

* cited by examiner

*Primary Examiner* — Benjamin O Dulaney
(74) *Attorney, Agent, or Firm* — Rossi, Kimms & McDowell LLP

(57) ABSTRACT

A communication job record display device that is capable of improving display of a destination in a record of transmission and reception. A display unit displays information about a communication job concerning transmission and reception with an external device. An obtaining unit obtains record information about the communication job including destination information. A display controller controls display by the display unit. The display controller changes a destination display method based on a size of a record display screen displayed on the display unit and the destination information about the record information obtained so that the destination information will be displayed on the display screen.

20 Claims, 19 Drawing Sheets

FIG. 7A

630 — To/Cc/Bcc
- 631 — To
- 632 — Cc
- 633 — Bcc

FIG. 7B

640 — Address Book (E-Mail)
- 641 — ✓ ✉ ★ AAA  aaa@abc.co.jp
- 641 — ✓ ✉ ★ BBB  bbb@abc.co.jp
- ✓ ✉ CCC  ccc@abc.co.jp
- 642 — ✓ ✉ ★ DDD  ddd@abc.co.jp
- ✓ ✉ EEE  eee@abc.co.jp
- ✓ ✉ FFF  fff@abc.co.jp 645   643   644 — Save (610b)

FIG. 7C

650 — Detail of Destination/Edit
- ✓ ✉ ★ To: AAA aaa@abc.co.jp
- 651 — ✓ ✉ ★ Cc: BBB bbb@abc.co.jp 652 Destination Release | 653 Destination Edit | 654 Detailed Information | 655 To/Cc/Bcc — 630

FIG. 7D

660 — Transmission History
- 661 — ✉ AAA<aaa@abc.co.jp>, BBB<bbb@abc.co.jp>...
- 662 — ✉ aaa@abc.co.jp, bbb@abc.co.jp, ccc@abc.co.jp
- 663 — ✉ To: AAA<aaa@abc.co.jp> Cc: BBB<bbb@abc.co.jp>

630 Press Destination

FIG. 12

Transmission Job History

| Receipt Number | Result | Start Time | Job Type | Total Destination Character String | Title | Number of Transmission Pages | Communication Mode | End Code |
|---|---|---|---|---|---|---|---|---|
| 17 | OK | 10/08 2018 01:34:52 PM | E-Mail | To: aaa@abc.co.jp, bbb@abc.co.jp Cc:ccc@abc.co.jp ddd@abc.co.jp, eee@abc.co.jp Bcc: fff@abc.co.jp, ... 1501 | Attached Image | 1 | Broadcast | |
| 16 | OK | 10/08 2018 12:55:34 PM | E-Mail | To: AAA<aaa@abc.co.jp>, BBB<bbb@abc.co.jp> | Attached Image | 1 | Broadcast | |
| 15 | OK | 10/08 2018 09:01:12 AM | E-Mail | To: AAA<aaa@abc.co.jp> ~1503  1502 | Attached Image | 3 | Ordinary | |
| 14 | OK | 10/08 2018 09:00:22 AM | E-Mail | To: aaa@abc.co.jp ~1504 | Attached Image | 1 | Ordinary | |
| 13 | OK | 10/08 2018 09:43:52 AM | E-Mail | BBB<bbb@abc.co.jp> ~1505 | Attached Image | 8 | Ordinary | |
| 12 | OK | 10/08 2018 09:29:24 AM | E-Mail | bbb@abc.co.jp ~1506 | Attached Image | 1 | Ordinary | |
| 11 | OK | 10/08 2018 10:00:15 AM | E-Mail | To: CCC ~1507 | Attached Image | 1 | Ordinary | |
| 10 | OK | 10/08 2018 09:59:40 AM | E-Mail | To: AAA<aaa@abc.co.jp>, BBB<bbb@abc.co.jp> Cc: ccc@abc.co.jp, ddd@abc.co.jp, eee@abc.co.jp  1508 | Attached Image | 1 | Broadcast | |
| 9 | NG | 03/08 2018 01:00:41 PM | E-Mail | To: ABC<abc@abc.co.jp>, JJJ<jjj@abc.co.jp> | | 0 | Broadcast | #752 |
| 8 | OK | 01/08 2018 09:59:39 AM | E-Mail | To: JJJ<jjj@abc.co.jp> | Attached Image | 1 | Ordinary | |

COMMUNICATION JOB RECORD DISPLAY DEVICE, CONTROL METHOD THEREFOR, AND STORAGE MEDIUM STORING CONTROL PROGRAM THEREFOR

BACKGROUND OF THE INVENTION

Field of the Invention

The present invention relates to a device that displays a record of a communication job concerning transmission and reception with an external device.

Description of the Related Art

There is a known communication apparatus that enables to select a destination of a data transmission by displaying communication jobs that will be transmitted to and received from external devices and communication jobs that have been transmitted to and received from external devices on a display unit (Japanese Laid-Open Patent Publication (Kokai) No. 2015-019291 (JP 2015-019291A)). A communication apparatus that executes a communication job for transmitting to and receiving from an external device includes an image forming apparatus, such as an MFP. An image forming apparatus transmits a scanned image to an external device by attaching it to an e-mail, for example. The image forming apparatus enables a group transmission by attaching transmission attributes, such as To, Cc, and Bcc, to a plurality of transmission destinations. The image forming apparatus saves a transmission history and displays transmission destinations in the past on a transmission history screen.

Incidentally, an area of a display screen of a display unit is restricted in a communication job display device of such an image forming apparatus. Particularly, in an image forming apparatus, many kinds of information may be stuffed and displayed on a screen that displays communication jobs. In this way, when the display area of the display unit is restricted or when the information currently displayed on the display screen is not suitable, a user has a possibility of misrecognizing a transmission destination. A user who misrecognized a transmission destination may use a transmission history for retransmission while keeping a misrecognized state.

Particularly, when there are a plurality of destinations and not all of the destinations are displayed on a display unit or a display screen, a user tends to forget a destination that is not displayed.

SUMMARY OF THE INVENTION

The present invention provides a communication job record display device that is capable of improving display of a destination in a record of transmission and reception.

Accordingly, a first aspect of the present invention provides a communication job record display device including a display unit configured to display information about a communication job concerning transmission and reception with an external device, an obtaining unit configured to obtain record information about the communication job including destination information, and a display controller configured to control display by the display unit. The display controller changes a destination display method based on a size of a record display screen displayed on the display unit and the destination information about the record information obtained so that the destination information will be displayed on the display screen.

Accordingly, a second aspect of the present invention provides a control method for a communication job record display device having a display unit on which information about a communication job concerning transmission and reception with an external device is displayed, the display control method including an obtaining step of obtaining record information about a communication job including destination information, and a display control step of controlling display by the display unit. A destination display method is changed based on a size of a record display screen displayed on the display unit and the destination information about the record information obtained so that the destination information will be displayed on the display screen in the display control step.

Accordingly, a third aspect of the present invention provides a non-transitory computer-readable storage medium storing a control program causing a computer to execute the control method of the second aspect.

According to the present invention, the display of a destination in a history of transmission and reception is improvable.

Further features of the present invention will become apparent from the following description of exemplary embodiments with reference to the attached drawings

BRIEF DESCRIPTION OF THE DRAWINGS

FIG. 7A through FIG. 7D are explanatory views showing various kinds of destination selection screens corresponding to operations on the display screens in FIG. 6.

FIG. 12 is an explanatory view showing an example of a transmission history of e-mails.

DESCRIPTION OF THE EMBODIMENTS

Figure 1:
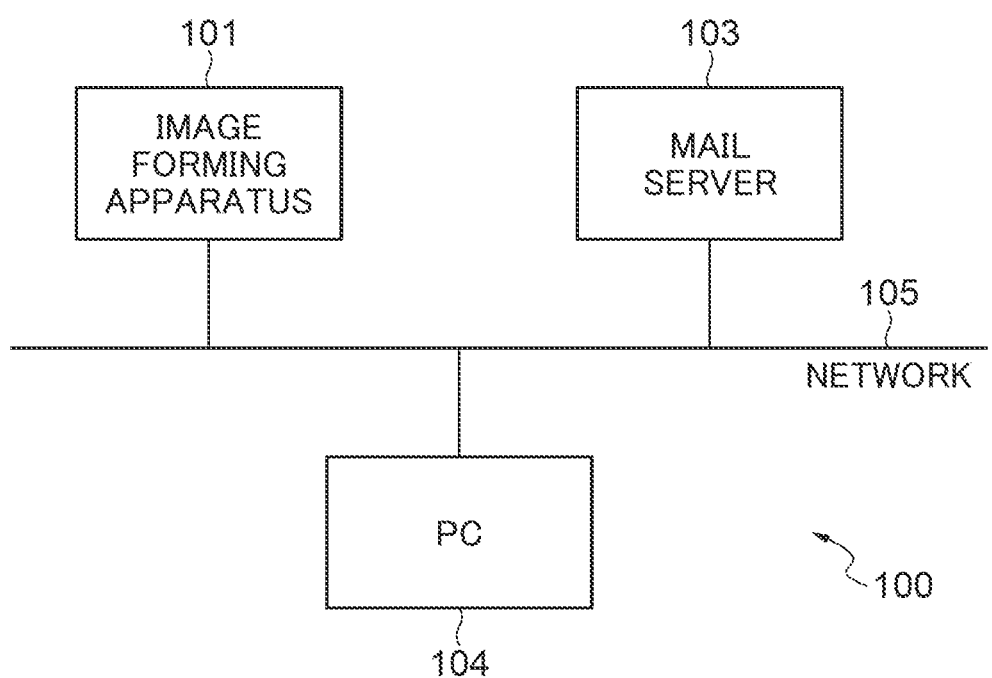
FIG. 1 is a block diagram showing an e-mail system including an image forming apparatus as a communication job record display device according to a first embodiment of the present invention.

Hereafter, embodiments according to the present invention will be described in detail by referring to the drawings. Configurations described in the following embodiments are only examples, and the scope of the present invention is not limited by the configurations described in the embodiments.

FIG. 1 is a block diagram showing an e-mail system 100 including an image forming apparatus 101 as a communication job record display device according to a first embodiment of the present invention. The e-mail system 100 in FIG. 1 has the image forming apparatus 101, a mail server 103, a PC 104, and a network 105 that connects these apparatuses so that a data communication is available. The network 105 may be connected with each apparatus by a wired system or a wireless system.

In the e-mail system 100, the image forming apparatus 101 attaches image data that is obtained by scanning a document to an e-mail on the basis of an e-mail transmission setting, and transmits the e-mail to the mail server 103. Image data may be electronic data, such as RAW data of an image, TIFF data, JPEG data, and PDF data.

The mail server 103 supports a SMTP protocol, for example. The mail server 103 classifies a received e-mail and attached image data into a mail box of each destination of an e-mail and saves them. The PC 104 receives an e-mail for a user of the PC 104 from the mail server 103 in accordance with a POP protocol. The PC 104 may connect with the image forming apparatus 101 with an HTTP protocol to update a setting with reference to a setting of the image forming apparatus 101. The PC 104 may refer various kinds of information (a transmission history, an apparatus name, user information, etc.) about the image forming apparatus 101.

Figure 2:
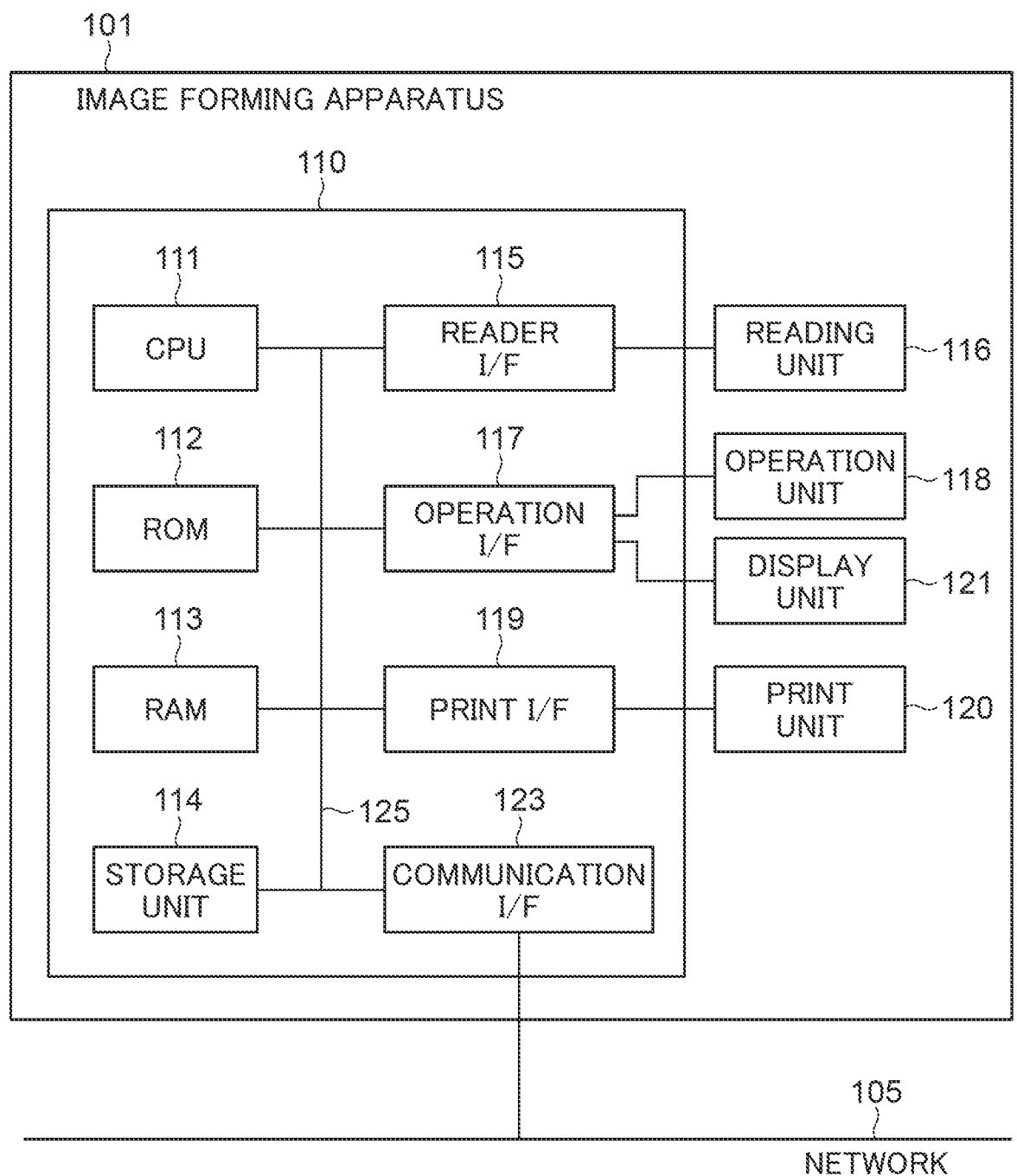
FIG. 2 is a block diagram schematically showing the image forming apparatus in FIG. 1.

FIG. 2 is a block diagram schematically showing a configuration of the image forming apparatus 101 in FIG. 1. The image forming apparatus 101 in FIG. 2 has a reading unit 116, a display unit 121, an operation unit 118, a print unit 120, and a controller 110 to which these units are connected.

The controller 110 has a CPU 111, a ROM 112, a RAM 113, a storage unit 114, a reading I/F 115, an operation I/F 117, a print I/F 119, a communication I/F 123, and a system bus 125 to which these components are connected.

The ROM 112 records a control program that can be executed by the CPU 111, and various kinds of data that are used for controlling. The ROM 112 may record a boot program, font data, etc.

The storage unit 114 mainly records image data, print data, an address book, various kinds of programs, and various kinds of setting information, for example. The storage unit 114 may be a nonvolatile flash memory that is not erased by OFF/ON of power, for example. In addition to this, the storage unit 114 may be an SSD, HDD, eMMC, etc.

The RAM 113 is a main memory of the CPU 111 and is used as a work area and a temporary memory area for developing a program. The ROM 112, RAM 113, and storage unit 114 constitute a recording unit of the image forming apparatus 101. The CPU 111 reads the program recorded in the ROM 112 or the storage unit 114, develops it to the RAM 113, and runs it. Thereby, the controller 110 for controlling entire actions of the image forming apparatus 101 is achieved in the image forming apparatus 101 in FIG. 2.

The controller 110 controls actions of the reading unit 116, display unit 121, operation unit 118, and print unit 120 to execute reading control, print control, e-mail transmission control, for example. It should be noted that the image forming apparatus 101 may be provided with a plurality of CPUs so that programs recorded in the ROM 112 or the storage unit 114 are distributed to the CPUs and are executed. Moreover, a part of programs mentioned later may be processed by hardware circuitry, such as an ASIC and a FPGA.

The reading I/F 115 is connected to the reading unit 116. The reading I/F 115 controls the reading unit 116 to read a document under the control of the CPU 111. The reading unit 116 reads a document and generates image data of the read document. The reading I/F 115 saves the image data that is generated by the reading unit 116 into the storage unit 114.

The print I/F 119 is connected to the print unit 120. The print I/F 119 controls the print unit 120 to print image data under the control of the CPU 111. The print I/F 119 outputs the image data in the storage unit 114 to the print unit 120. The print unit 120 prints the input image data on a sheet etc.

The communication I/F 123 is connected to the network 105. The communication I/F 123 performs data communication with another apparatus connected to the network 105 under the control of the CPU 111. When receiving an e-mail to which image data in the storage unit 114 is attached from the CPU 111, the communication I/F 123 transmits the e-mail to the mail server 103. The communication IT 123 may transmit image data with various kinds of communication protocols, such as FTP, SMB, WebDAV, and SMTP. When obtaining data about a setting screen of the image forming apparatus 101, the communication I/F 123 transmits the data about the setting screen to the PC 104. When receiving various setting values from the PC 104, the communication I/F 123 records them into the storage unit 114. The communication I/F 123 may transmit and receive the data about the setting values and setting screen with various communication protocols, such as HTTP. In this case, the CPU 111 executes a Web server application stored in the ROM 112 to control an HTTP connection by the communication I/F 123.

The operation I/F 117 is connected to the operation unit 118 and the display unit 121. The operation I/F 117 controls the display unit 121 to display a screen under the control of the CPU 111. The display unit 121 is a liquid crystal display device, for example. The display unit 121 displays a screen concerning an operation on a display surface of the liquid crystal display device.

The operation unit 118 is a touch panel device arranged over the liquid crystal display device, for example. The operation unit 118 outputs operation information like a position of an operation as a user's operation with respect to the display unit 121. The operation I/F 117 specifies user's operation content on the basis of the display screen currently displayed on the display unit 121 and the operation information output from the operation unit 118, and outputs input data corresponding to the specified operation content to the CPU 111.

The image forming apparatus 101 accumulates and records a transmission history of communication jobs using e-mails in the storage unit 114. Moreover, the image forming apparatus 101 displays a transmission history of e-mails on the display unit 121 in response to a user's call operation and is able to retransmit a new e-mail to at least one destination of a transmission record (record information) selected from the displayed transmission history. In this specification, it should be noted that the transmission history means a list of contents of a plurality of e-mails and that the transmission record means one content corresponding to one e-mail in the transmission history. The transmission record may include a plurality of destinations. One of the destinations in the transmission record is referred to as a transmission-record destination.

The display unit 121 of the image forming apparatus 101 is used for setting various kinds of functions of the image forming apparatus 101 and is not basically large. The display surface of the display unit 121 of the image forming apparatus 101 will be restricted. In the meantime, the transmission record of one e-mail may include a plurality of destinations in a case of broadcast transmission (multi-address transmission). In this case, not all the destinations are displayed on the display unit 121 of the image forming apparatus 101. Moreover, when a mail address or an attached name of one destination is long, not all of them are displayed on the display unit 121 of the image forming apparatus 101.

Moreover, destinations of an e-mail have transmission attributes, such as "To", "Cc", and "Bcc". The transmission attribute "To" is generally used for a direct destination of an e-mail and is displayed at the destination. The transmission attribute "Cc" is generally used for an indirect destination of an e-mail and is displayed at the destination. The transmission attribute "Bcc" is generally used for an indirect destination of an e-mail and is not displayed at the destination. One of these transmission attributes is designated for each destination in an e-mail. When a destination of an e-mail is displayed, it is preferable to display transmission attribute in association with the destination.

When not all these items of the destination information are appropriately displayed on the display screen of the transmission history of communication jobs, a user may transmit an e-mail to destinations different from what are assumed essentially. The user may wrongly select a non-display destination as a destination of retransmission without checking that there is a non-display destination.

Particularly, the image forming apparatus 101 displays various kinds of information including date and time of an e-mail and information about attached image data in addition to a destination of an e-mail collectively on the screen that displays the transmission history of communication jobs. The screen that displays the transmission history of communication jobs is preferably designed so that a destination of retransmission will be selectable appropriately by referring to these pieces of the information. In this case, since the area in which destinations are displayed in the display screen becomes still smaller, the number of destinations that can be displayed decreases.

Moreover, when a data amount of one transmission record of the transmission history increases, the number of transmission records in the transmission history that can be accumulated in the storage unit 114 decreases. Accordingly, some image forming apparatuses may restrict the data amount per record. However, if the information about an e-mail destination is decreased in order to restrict the data amount per record in this way, a user may select an unsuitable transmission record as a destination of retransmission from the transmission history.

A communication job record display device, such as an image forming apparatus, is desired to improve display of transmission-record destination in consideration of usability in this way. Hereinafter, a counterplan of this embodiment will be described.

Figure 3:
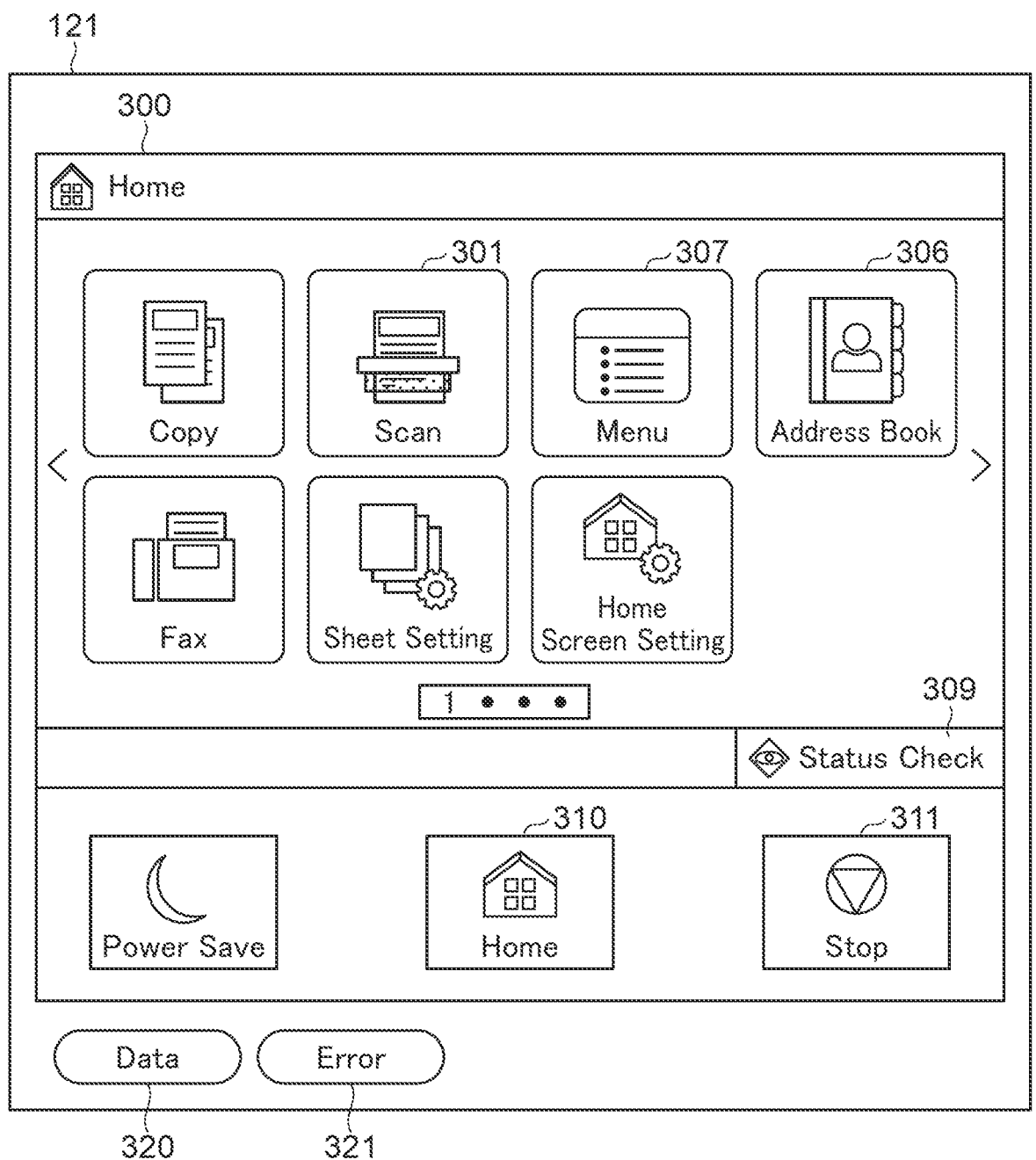
FIG. 3 is an explanatory view showing a home screen displayed on a display unit in FIG. 2.

FIG. 3 is an explanatory view showing a home screen 300 displayed on the display unit 121 in FIG. 2. When the image forming apparatus 101 is activated, the CPU 111 displays the home screen in FIG. 3 on the display unit 121, for example. The display unit 121 in FIG. 3 has the liquid crystal display device over which the touch panel device is arranged, a data LED 320 and an error LED 321. A plurality of function buttons, such as a scan button 301, a menu button 307, and an address book button 306, are displayed on the liquid crystal display device. A user operates a button displayed on the liquid crystal display device by operating the touch panel device arranged over the liquid crystal display device.

The CPU 111 executes control corresponding to an operated button (a display object) by running a program associated with the operated button. For example, when a status check button 309 is operated, the CPU 111 controls the display unit 121 to switch the display so as to display a status check screen 400 (FIG. 4) on the display unit 121 for checking the status of the image forming apparatus 101.

When a scan button 301 is operated, the CPU 111 displays transmission setting screens on the display unit 121 for executing e-mail transmission and file transmission with communication protocols, such as FTP, SMB, and WebDAV, from the image forming apparatus 101. When a menu button 307 is operated, the CPU 111 displays menu screens on the display unit 121 for various settings of the image forming apparatus 101. When an address book button 306 is operated, the CPU 111 displays an address book display screen 640 (FIG. 7B) showing contents of an address book of the image forming apparatus 101 on the display unit 121. When a stop button 311 is operated, the CPU 111 stops processes of the image forming apparatus 101 that are currently executed. When a home button 310 is operated, the CPU 111 displays the home screen in FIG. 3 on the display unit 121.

The stop 311 and home button 310 may be always displayed on the display unit 121. The Data LED 320 and error LED 321 show the status of the image forming apparatus 101. The CPU 111 turns on the data LED 310, when execution of a transmission job or a print job is started. The CPU 111 turns off the data LED 310, when execution of a transmission job or a print job is completed. The CPU 111 turns on the error LED 311, when an error (paper jam, paper out, etc.) occurs in the image forming apparatus 101.

Figure 4:
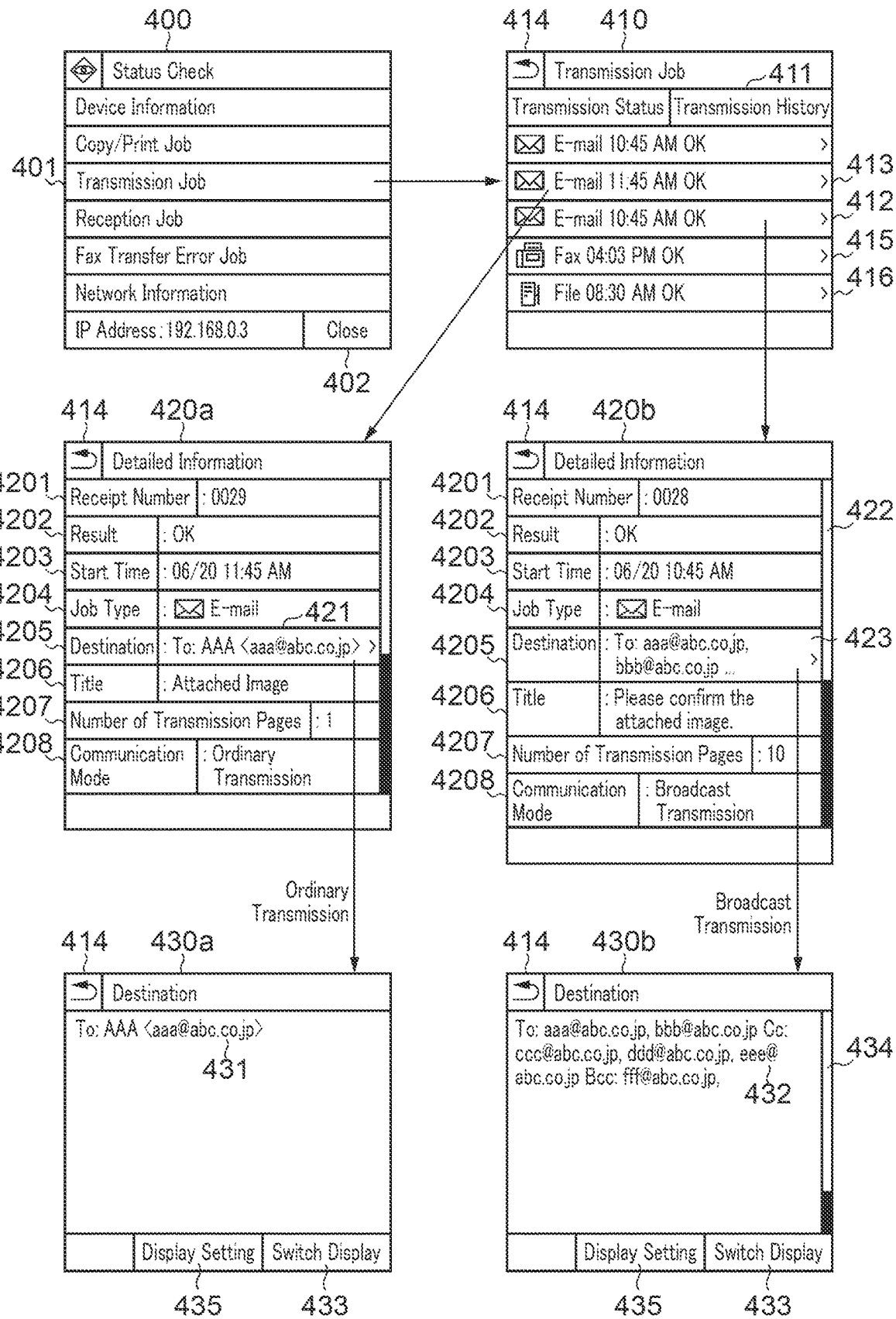
FIG. 4 is an explanatory view showing an example of a screen change until at least one transmission-record destination of an e-mail is displayed on the display unit.

FIG. 4 is an explanatory view showing an example of a screen change until at least one transmission-record destination of an e-mail is displayed on the display unit 121. In FIG. 4, when a button at a start point of an arrow is pressed, a screen indicated by an end point of the arrow is displayed. When the status check button 309 of the home screen 300 in FIG. 3 is operated, the CPU 111 displays the status check screen 400 in FIG. 4 on the display unit 121. In the status check screen 400, buttons for device information, a copy/print job, a transmission job, a receiving job, a fax transfer error job, and network information are displayed as checkable statuses. Moreover, an IP address and a close button 402 are displayed on the status check screen 400.

When a transmission job button 401 in the status check screen 400 is operated, the CPU 111 displays a transmission job check screen 410 in FIG. 4 that shows statuses and a history of transmission jobs on the display unit 121. Buttons corresponding to transmitted e-mails, transmitted facsimiles, and transmitted files are displayed as a list in the transmission job check screen 410 as a transmission history. A transmission-status tab button and a transmission-history tab button 411 are displayed on the transmission job check screen 410.

The CPU 111 displays statuses or a history on the transmission job check screen 410 according to an operation of the tab buttons. Moreover, a back button 414 is displayed on the transmission job check screen 410 at upper left. When an e-mail button 413 of the transmission history is operated, the CPU 111 displays a detailed information screen 420a in FIG. 4 on the display unit 121. When an e-mail button 412 is operated, the CPU 111 displays a detailed information screen 420b on the display unit 121. Buttons showing various kinds of information, such as a destination of an e-mail selected from the transmission history, are displayed on the detailed information screen 420a or the detailed information screen 420b in FIG. 4.

In each of the detailed information screen 420a and the detailed information screen 420b, a reception number field 4201, a transmission result field 4202, a start time field 4203, a job type field 4204, a destination field 4205, a subject name field 4206, a number of transmission pages field 4207, and a communication mode field 4208 are displayed. Contents of the transmission record are described by referring to Table 2 mentioned later. When a scroll bar 422 is operated, the CPU 111 scrolls the contents of the detailed information screen 420b displayed on the display unit 121. When the destination button 421 is operated in the detailed information screen 420a, the CPU 111 displays a destination screen 430a showing a transmission-record destination of an e-mail on the display unit 121. When the destination button 423 is operated in the detailed information screen 420b, the CPU 111 displays a destination screen 430b showing transmission-record destinations of an e-mail on the display unit 121.

The CPU 111 displays at least one destination on the destination fields 4205 of the detailed information screens 420a and 420b, the destination screens 430a and 430b on the basis of a transmission-record destination display setting 8000 shown in the below-mentioned Table 1. The CPU 111 as a display controller changes a destination display method in the destination fields 4205 and the destination screens 430a and 430b on the basis of the size of the destination display area displayed on the display unit 121 and the string length of all the destinations of the obtained transmission record. Particularly, in the destination screens 430a and 430b, the destination display method in the display screen is changed so that all the transmission-record destinations can be displayed as much as possible on the display screen as a list.

For example, the destination screen 430a in FIG. 4 displays the destination about the e-mail whose reception number is 0029. The number of the destinations of the e-mail whose reception number is 0029 is one. The communicate mode is ordinary transmission (single-address transmission). In this case, the CPU 111 displays a destination character string 431 including a transmission attribute "To:", a name "AAA", and a mail address "<aaa@abc.co.jp>" that are set at the time of transmission in the destination field 4205 of the detailed information screen 420a and the destination screen 430a. Moreover, a display setting button 435 and a display switching button 433 that will be mentioned later are displayed in the destination screen 430a in FIG. 4.

When only one destination is selected from the address book and is transmitted in the ordinary transmission, the destination character string is displayed in the format of "To: name <mail address>" like the destination character string 431. For example, when a destination whose name is "AAA" and mail address is "aaa@abc.co.jp" is selected from the address book, a destination character string "To: AAA<aaa@abc.co.jp>" is displayed.

The destination screen 430a in FIG. 4 displays the destination about the e-mail whose reception number is 0028. The number of the destinations of the e-mail whose reception number is 0028 is more than two. The communicate mode is broadcast transmission (multi-address transmission). In this case, the CPU 111 displays a destination character string 432 including transmission attributes (To/Cc/Bcc) and mail addresses that are set at the time of transmission in the destination field 4205 of the detailed information screen 420b and the destination screen 430b. That is, names are not displayed. A plurality of destinations are continuously displayed with "," (comma) as a separator. When the string length of the destinations exceeds the string length that can be displayed in the destination field 4205, a horizontal ellipsis " . . . " is added to the end of the character string of the destinations that can be displayed.

When the transmission-record destinations cannot be displayed within the destination screen 430b, the CPU 111 displays a scroll bar 434 so that all the destinations can be displayed by scrolling the destination screen 430b in response to an operation of the scroll bar 434. Moreover, when the string length of the transmission-record destinations exceeds the maximum string length that can be saved as destinations, the horizontal ellipsis " . . . " is added to the end of the destinations to show a user that at least one destination follows the displayed destinations. Moreover, the display setting button 435 and the display switching button 433 that will be mentioned later are displayed in the destination screen 430b in FIG. 4.

In this way, when the number of destinations of the obtained transmission record is equal to or less than the predetermined number (one in this embodiment) that is the number of destinations that can be displayed in the destination screen on the display unit 121, the CPU 111 as the display controller displays destinations by a first display method. In the first display method, all the destinations of a transmission record are displayed on the display screen as a list. Moreover, the CPU 111 as a display controller displays destinations by a second display method when the number of destinations of the obtained transmission record is more than the predetermined number (i.e., two or more) that is the number of destinations that can be displayed in the destination screen on the display unit 121. In the second display method, all the destinations of a transmission record are displayed in a more compact style than the first display method on the display screen as a list.

TABLE 1

Transmission Record Destination Display Setting 8000

| Setting Item | Setting Contents (o: Default) | | |
|---|---|---|---|
| Display Method of Transmission Attribute (Cc/Bcc) 8001 | Display at Head of Line | Display Following Previous Destination o | |
| Destination Information Screen 8002 | Switch | Not Switch o | |
| Transmission Attribute (To/Cc/Bcc) 8003 | Add o | Not Add | |
| Auto-Adjustment of Destination Form To/Cc/Bcc 8030 | Adjust | Not Adjust o | |
| To-Destination Form (Ordinary) 8004 | Name | Address | Name + Address o |
| To-Destination Form (Broadcast) 8005 | Name | Address o | Name + Address |
| Character of To-Destination 8006 | Small Font | Standard o | |
| Cc-Destination 8010 | Display o | Non-Display | |
| Cc-Destination Form 8011 | Name | Address o | Name + Address |
| Character of Cc-Destination 8013 | Small Font | Standard o | |
| Bcc-Destination 8020 | Display o | Non-Display | |
| Bcc-Destination Form 8021 | Name | Address o | Name + Address |
| Character of Bcc Destination 8023 | Small Font | Standard o | |

Figure 5:
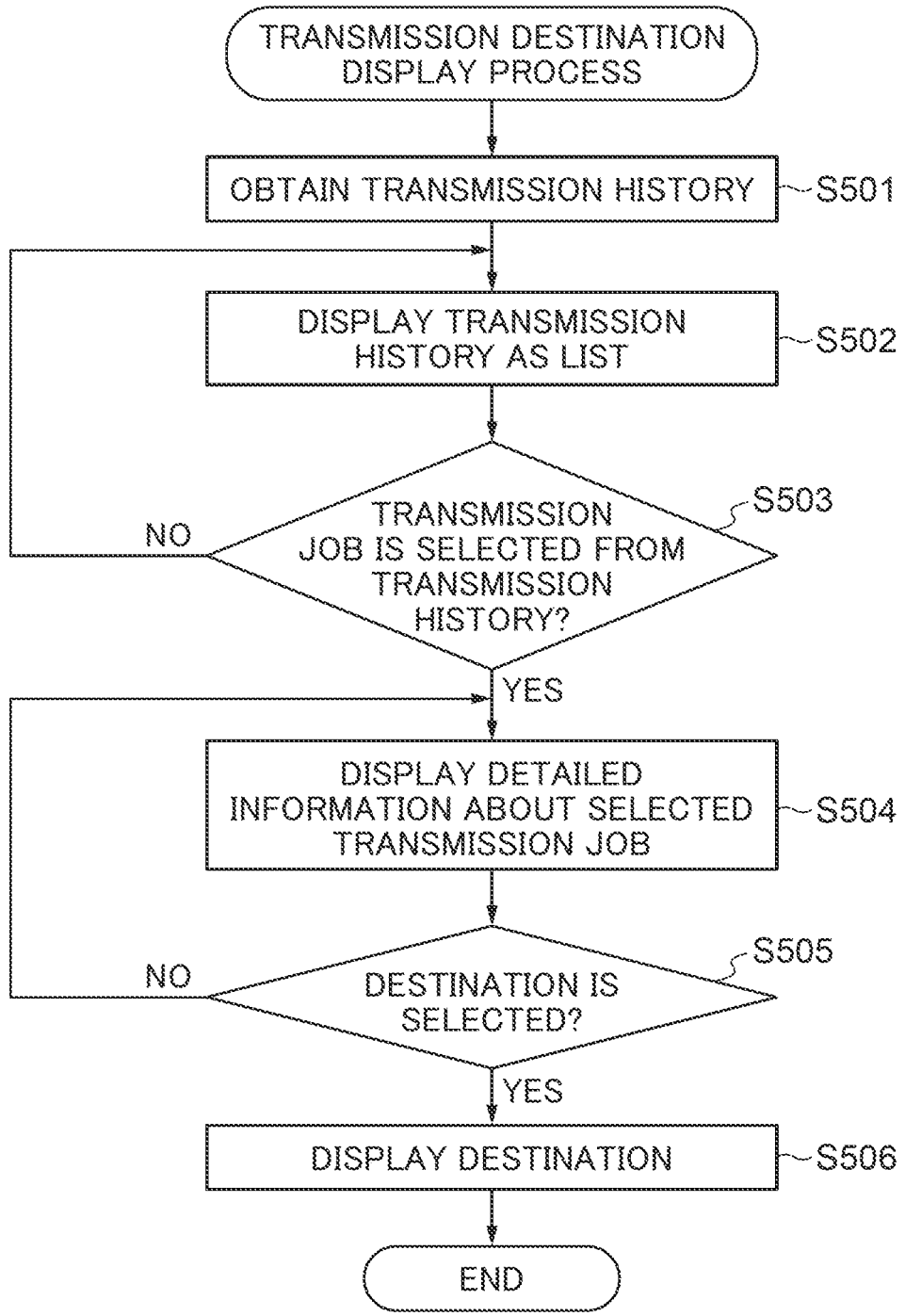
FIG. 5 is a flowchart showing a transmission destination display process executed by a CPU in FIG. 2 to display a transmission-record destination of an e-mail.

FIG. 5 is a flowchart showing a transmission destination display process executed by the CPU 111 in FIG. 2 in order to display transmission-record destinations of an e-mail. The CPU 111 executes the process in FIG. 5 by reading and writing the storage 114, RAM 113, and ROM 112 and by controlling the display unit 121, operation unit 118, reading unit 116, and communication I/F 123. In step S501, the CPU 111 obtains the transmission history from the storage 114. In step S502, the CPU 111 displays the transmission job check screen 410 on the display unit 121. In the transmission job check screen 410, a job type, start time, a transmission result (OK/NG), and an error code when the result is NG are displayed for every transmission job.

Moreover, the CPU 111 enables to scroll the list display of the transmission history depending on the display area of the display unit 121. The CPU 11 displays icons that show types of jobs for every job. In step S503, the CPU 111 determines whether one of the transmission jobs currently displayed in the transmission job check screen 410 is selected. When one of the transmission jobs is not selected, the CPU 111 returns the process to the step S502. The CPU 111 repeats the processes in the steps S502 and S503 until one of the transmission jobs is selected.

When one of the transmission jobs is selected, the CPU 111 holds the reception number of the selected job and proceeds with the process to step S504. In the step S504, the CPU 111 obtains a transmission record corresponding to the reception number held in the step 503 and displays the detailed information screen 420a or the detailed information screen 420b about the selected transmission job. Contents of detailed information saved in a transmission record are shown in Table 2.

Detailed information saved in a transmission record is generated for every execution of a transmission job and is saved for every job in the nonvolatile storage 114. The content in the destination field 4205 of the transmission record is obtained by converting the destination information at the time of e-mail transmission into a destination display character string by the above-mentioned first display method or second display method and is stored in the storage 114. In step S505, the CPU 111 determines whether the destination button 421 or 423 in the detailed information screen 420a or 420b is selected by a user's operation. When the destination buttons 421 and 423 in the detailed information screens 420a and 420b are not selected by a user's operation, the CPU 111 returns the process to the step S504. The CPU 111 repeats the processes in the steps S504 and S505 until the destination button 421 or 423 is selected.

When the destination button 421 or 423 in the detailed information screen 420a or 420b is selected by a user's operation, the CPU 111 proceeds with the process to step S506. In the step S506, the CPU 111 obtains the destination display character string stored in the destination field 4205 according to the reception number of the transmission record that is currently displayed, and then, displays the obtained destination display character string on the destination screen 430a or the destination screen 430b.

TABLE 2

Transmission Record

| Display Item | Content |
|---|---|
| Reception Number 4201 | Four Digit Number Starting from 0001. Incremented whenever New Job is generated. |
| Transmission Result 4202 | Result of Transmission (OK/NG). Error Code is added in case of NG. |
| Start Time 4203 | Time of starting Transmission. |
| Job Type 4204 | E-mail, I-fax, or File |
| Destination 4205 | Mail Addresses and Transmission Attributes (Character Strings) designated by To/Cc/Bcc. Name or Address of Destination Server in case of File Transmission. |
| Title 4206 | Character String entered into Subject Header. |
| Number of Transmission Pages 4207 | Number of Pages of Transmission Images. |
| Transmission Mode 4208 | Normal Transmission, Broadcast Transmission |

Figure 6:
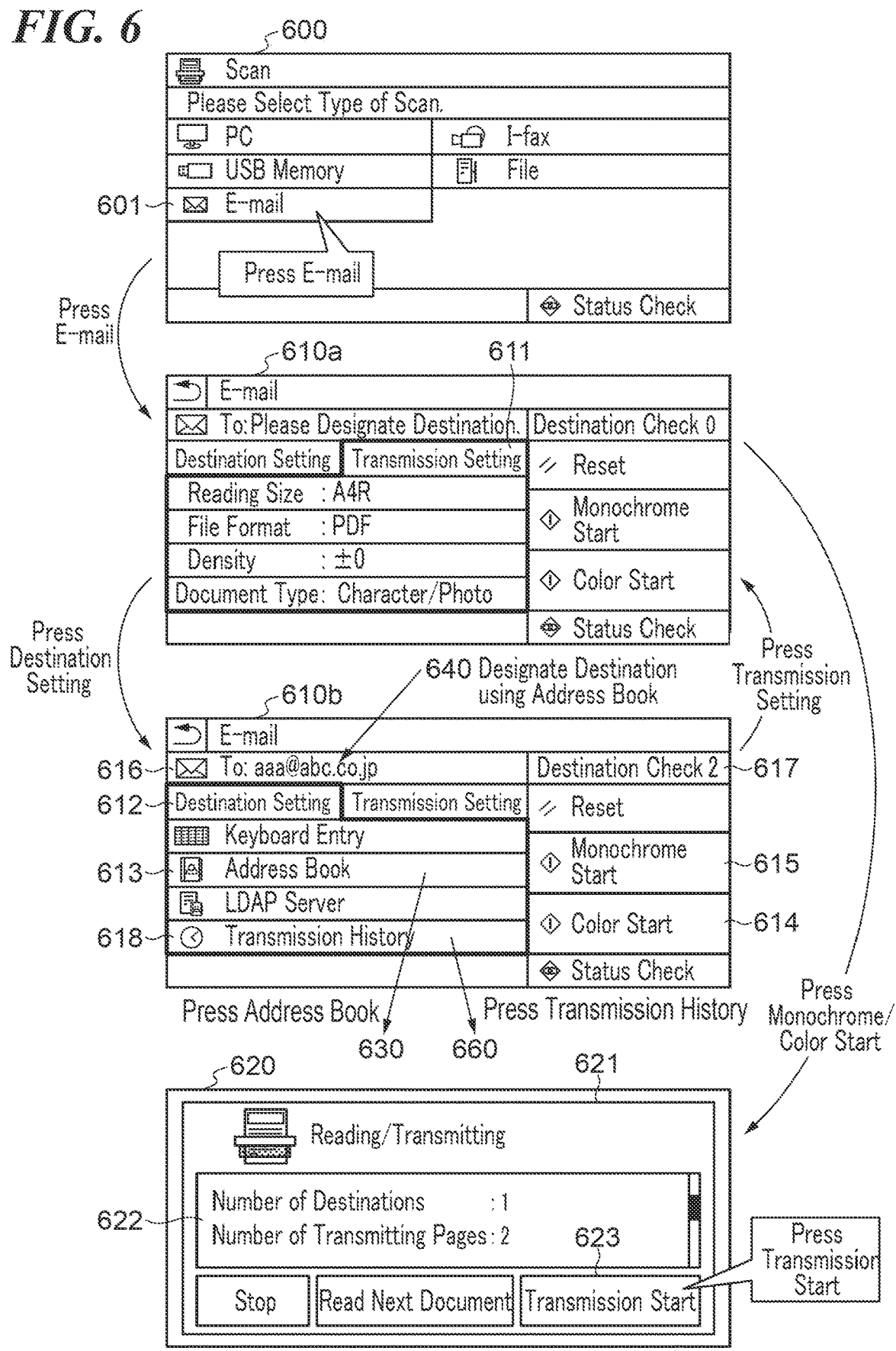
FIG. 6 is an explanatory view showing a screen change of a display screen displayed on the display unit in FIG. 2 when an e-mail is transmitted.

FIG. 6 is an explanatory view showing a screen change of the display screen on the display unit 121 in FIG. 2 when an e-mail is transmitted. When the scan button 301 of the home screen 300 in FIG. 3 is operated, the CPU 111 displays a scan screen 600 in FIG. 6 on the display unit 121. When a scanned image is transmitted with attaching to an e-mail, a user operates an e-mail button 601. In response to this, the CPU 111 displays an e-mail screen 610a or 610b in FIG. 6 on the display unit 121.

A destination setting tab button 612 and a transmission setting tab button 611 are displayed on each of the e-mail screens 610a and 610b. As shown in FIG. 6, the status check button is displayed in job setting screens, such as the e-mail screens 610a and 610b, besides the home screen 300. The e-mail screen 610a is displayed when the transmission setting tab button 611 is operated. On the e-mail screen 610a, setting buttons about reading of a document, such as a reading size button, a file format button for an image generated by reading a document, a density button, and a document type button, are displayed.

The e-mail screen 610b in FIG. 6 is displayed when the destination setting tab button 612 is operated. Setting buttons for setting a transmission destination are displayed on the e-mail screen 610b. A keyboard entry button, an address book button 613, an LDAP server button, and a transmission record button 618 are displayed on the e-mail screen 610b. When a keyboard entry button is operated, the CPU 111 displays a keyboard. A user directly enters a mail address of a transmission destination from a keyboard. Thereby, the CPU 111 obtains the transmission destination of the e-mail.

When the address book button 613 is operated, the CPU 111 displays the address book display screen 640 (FIG. 7B) registered in the storage 114. The address book includes information, such as a transmission type (an e-mail, a file, a facsimile, etc.), a name, destination data (a mail address, a host name, server information, etc.), and account information (a user name and a password). A user selects a mail address of a destination from the mail addresses displayed. Thereby, the CPU 111 obtains the transmission destination of the e-mail selected by the user's operation from the address book.

When the LDAP server button is operated, the CPU 111 obtains and displays an address book registered in an LDAP server (not shown). The user selects a mail address of a destination from mail addresses displayed. Thereby, the CPU 111 obtains the transmission destination of the e-mail selected by the operation. When the transmission record button 618 is operated, the CPU 111 displays the transmission history registered in the storage 114. The user selects the desired transmission record from the transmission history displayed. Thereby, the CPU 111 obtains at least one transmission destination of the e-mail included in the transmission record selected by the operation.

When a monochrome start button 615 or a color start button 614 is operated on the e-mail screen 610a or 610b in FIG. 6, the CPU 111 starts a preparation process for an e-mail transmission and displays a transmission screen 620 on the display unit 121. A message 621 of "Reading/Transmitting", a message 622 about the number of destinations and the number of transmission pages, and a transmission start button 623 are displayed on the transmission screen 620. The number of destinations 622 is the number of the destinations of the e-mail transmission. The number of transmission pages is the number of pages of the document that is transmitted with attaching to the e-mail. The transmission start button 623 may be displayed for every page while reading a document. When the transmission start button 623 is operated, the CPU 111 executes an e-mail transmission process.

FIG. 7A through FIG. 7D are explanatory views showing various kinds of destination selection screens corresponding to operations on the display screens in FIG. 6. FIG. 7A is a destination setting screen 630 for respective transmission attributes displayed when the address book button 613 is operated on the e-mail screen 610b in FIG. 6. A To button 631, Cc button 632, and Bcc button 633 are displayed on the setting screen 630. When the To button 631, Cc button 632, or Bcc button 633 is operated, the CPU 111 displays the address book display screen 640 in FIG. 7B. Buttons corresponding to a plurality of destinations included in the address book are displayed as a list on the address book display screen 640. When a mail address button 643 displayed on an icon menu in a lower part of the address book display screen 640 is operated, the CPU 111 display an e-mail address registered in the address book on each button.

When a star mark button 645 is operated, the CPU 111 displays facsimile numbers, e-mail addresses, I-facsimile (Internet facsimile) addresses, file transfer destinations, etc. that are registered in an often-used setting are displayed on the address book display screen 640.

When the destination buttons are selected by operations on the address book display screen 640 in FIG. 7B, the CPU 111 displays checked marks 641 on the buttons of the selected destinations. Unchecked marks 642 are displayed on the destination buttons that are not selected. A plurality of destinations are selected in the case of the broadcast transmission. When a save button 644 is operated, the CPU 111 sets the destinations that are selected at the time of the operation as the transmission destinations of the transmission attribute concerned and displays the e-mail screen 610b in FIG. 6 on the display unit 121. When a plurality of destinations are selected, the number of destinations displayed on the destination check button 617 becomes two or more. When the destination check button 617 is operated, the CPU 111 displays the selected destinations on the detailed address confirmation screen 650 in FIG. 7C. At least one e-mail address that is set as the destination of the e-mail is classified into the transmission attributes To/Cc/Bcc and is displayed on the detailed address confirmation screen 650.

When a destination button 651 is operated on the detailed address confirmation screen 650, the CPU 111 displays the checked mark at the left end of a button and enables the destination to be operated. Then, when a destination release button 652 in the lower part of the screen is operated, the CPU 111 removes the destination to which the checked mark is displayed from the e-mail destinations. When the destination edit button 653 is operated, the CPU 111 enables the destination to which the checked mark is displayed to be edited. When a detailed information button 654 is operated, the CPU 111 displays the detailed information about the destination to which the checked mark is displayed. When a To/Cc/Bcc button 655 is operated, the CPU 111 displays a transmission attribute change screen for the destination to which the checked mark is displayed. In this case, the CPU 111 may display the setting screen 630 in FIG. 7A.

FIG. 7D shows a transmission-record selection screen 660 that is displayed when the transmission record button 618 on the e-mail screen 610b in FIG. 6 is operated. Transmission record buttons 661, 662, and 663 corresponding to the transmission jobs that have been transmitted are displayed as a list on the transmission-record selection screen 660. Destinations are respectively displayed on the transmission record buttons 661, 662, and 663.

When one of the transmission record buttons 661, 662, and 663 is operated, the CPU 111 obtains all the e-mail addresses included in the transmission record selected by the operation as the transmission destinations. Moreover, the CPU 111 displays the e-mail screen 610a or 610b in FIG. 6 on the display unit 121. On the transmission-record selection screen 660, the destinations are displayed on the transmission record buttons by respectively different display methods. For example, on the transmission record button 661, a destination is shown by a name and mail address. The two destinations AAA<aaa@abc.co.jp> and BBB<bbb@abc.co.jp>, and the horizontal ellipsis " . . . " showing that another destination is set is displayed.

On the transmission record button 662, a transmission destination is shown by a mail address only. Three destinations that are all the transmission destinations are displayed. On the transmission record button 663, a destination is shown by a transmission attribute, name and mail address. One destination AAA<aaa@abc.co.jp> is displayed for the transmission attribute To. One destination BBB<bbb@abc.co.jp> is displayed for the transmission attribute Cc. A user understands details of destinations by changing the display method of destinations in this way, which reduces user's mis setting of a destination to which an e-mail has been transmitted. The above process corresponds to the change of the display screen at the time of e-mail transmission.

Figure 8A:
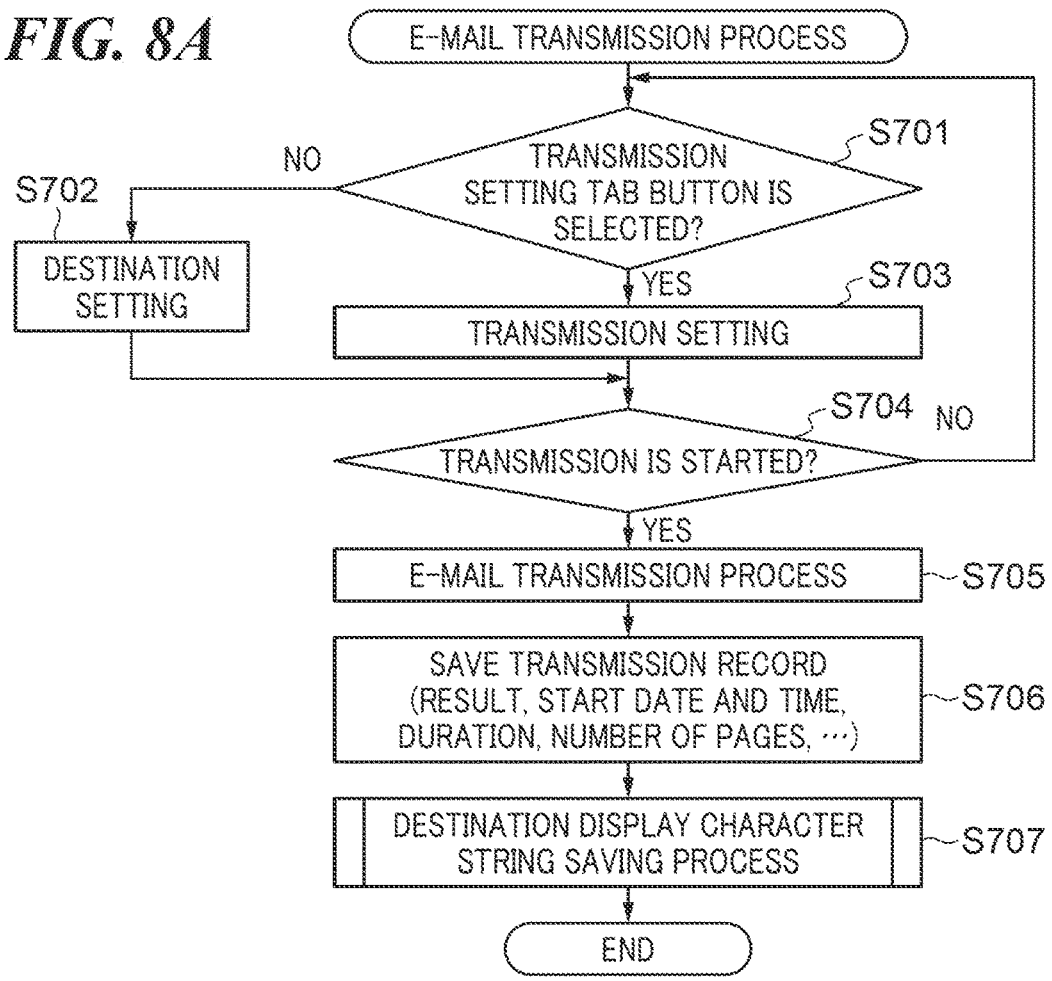
FIG. 8A and FIG. 8B are flowcharts showing parts of a display control process executed by the CPU in FIG. 2 when a user creates and transmits an e-mail.
Figure 8B:
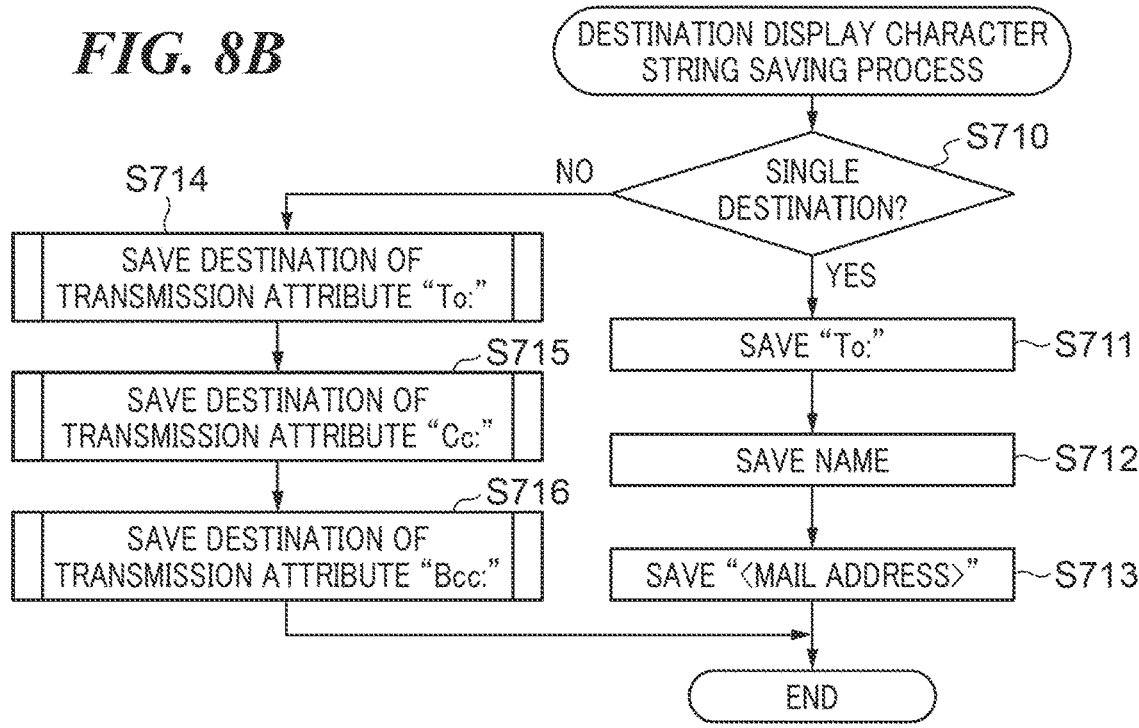

FIG. 8A and FIG. 8B are flowcharts showing parts of a display process executed by the CPU 111 in FIG. 2 when a user creates and transmits an e-mail. FIG. 8A is a flowchart showing the process that creates and transmits an e-mail.

In step S701, the CPU 111 determines whether the transmission setting tab button 611 is selected on the e-mail screen. When the transmission setting tab button 611 is not selected, the CPU 111 proceeds with the process to step S702. In the step S702, the CPU 111 sets at least one transmission destination of an e-mail according to a user's instruction. The process for setting the transmission destination(s) of an e-mail has been described in the above description about the screen change. The CPU 111 saves data like an address of a set destination in the RAM 113.

When the transmission setting tab button 611 is selected, the CPU 111 proceeds the process to step S703. In the step S703, the CPU 111 performs reading setting about an image file attached to the e-mail and transmission setting about a body text and subject of the e-mail according to an instruction from a user. The CPU 111 saves setting data in the work area etc. of the RAM 113. In step S704, the CPU 111 determines whether transmission of the e-mail is started in response to an operation of the monochrome start button 615 or the color start button 614. When the transmission of the e-mail is not started, the CPU 111 returns the process to the step S701. When the transmission of the e-mail is started, the CPU 111 proceeds with the process to step S705.

The CPU 111 reads a document placed on the reading unit 116 and saves the read image data in the RAM 113 in the step S705. The CPU 111 converts the saved image data into an attached file of the e-mail and transmits the e-mail to the mail server 103 from the communication I/F 123 through the network 105. The CPU 111 transmits the e-mail on the basis of the destination(s) and the transmission setting that have been set in the steps S702 and S703. When the monochrome start button 615 is operated, the CPU 111 reads the document in monochrome, attaches the read image file to the e-mail, and transmits the e-mail. When the color start button 614 is operated, the CPU 111 reads the document in color, attaches the read image file to the e-mail, and transmits the e-mail.

In step S706, the CPU 111 accumulates and records the transmission record of the e-mail processed in the step 705 in the storage 114. In step S707, the CPU 111 generates a destination display character string used when indicating transmission destinations from the transmission record of the e-mail and saves it in the storage 114.

FIG. 8B is a flowchart showing the destination display character string saving process in the step S707 in FIG. 8A. In step S710, the CPU 111 determines whether the number of the destination(s) set in the step S702 is one. When the number of the set destination(s) is one, the CPU 111 proceeds with the process to step S711. When the number of the set destinations is two or more, the CPU 111 proceeds with the process to step S714.

When saving one destination, the CPU 111 saves the transmission attribute "To:" as the destination display character string in the storage 114. In step S712, the CPU 111 adds the name of the transmission destination to the end of the destination display character string in the storage 114. In step S713, the CPU 111 adds brackets "<" and ">" before and after the mail address as "<mail address>" and adds it to the end of the destination display character string in the storage 114.

When saving the plurality of destinations, the CPU 111 saves destinations of the transmission attribute "To:" as the destination display character string in the storage 114 in step S714. In the following step S715, the CPU 111 adds destinations of the transmission attribute "Cc:" to the end of the destination display character string in the storage 114. In the following step S716, the CPU 111 adds destinations of the transmission attribute "Bcc:" to the end of the destination display character string in the storage 114. In the storage 114, the maximum string length of the destination display character string that can be saved as the transmission-record destinations is decided.

Figure 9:
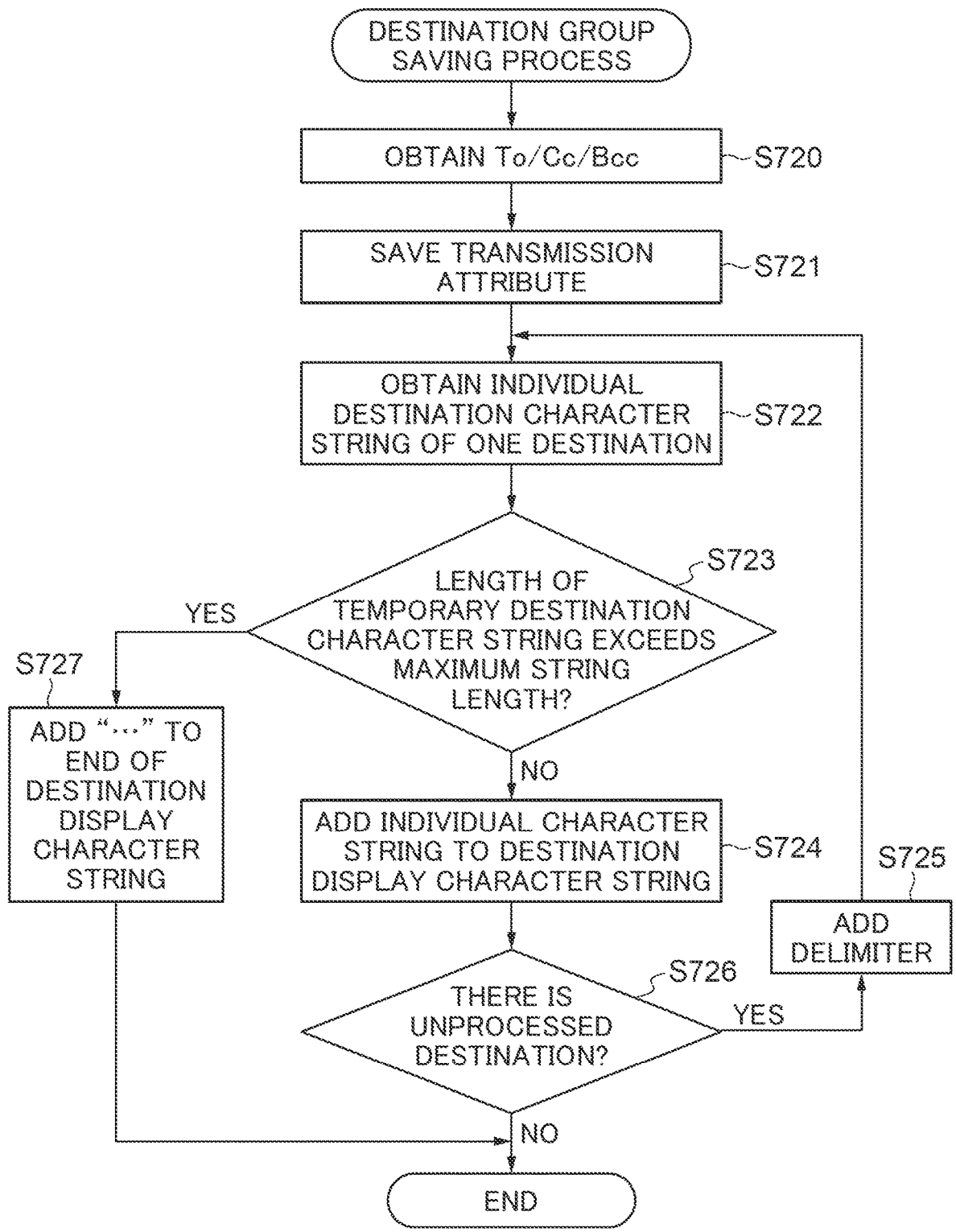
FIG. 9 is a flowchart showing a destination group saving process in steps S714, S715, and S746 in FIG. 8B.

FIG. 9 is a flowchart showing a destination group saving process in the steps S714, S715, and S716 in FIG. 8B. In step S720, the CPU 111 obtains a character string of a transmission attribute set in the step S714, S715, or S716. In step S721, the CPU 111 saves the obtained character string "To:", "Cc:", or "Bcc:" showing the transmission attribute to the destination display character string in the storage 114. In step S722, the CPU 111 obtains an individual destination character string of one destination of the transmission attribute set after operating the destination setting tab button 612 and saves it in the RAM 113. Contents of an individual destination character string are set for every transmission attribute on the basis of the keyboard entry, the address book, the LDAP server, or the transmission history.

In step S723, the CPU 111 determines whether the length of a temporary destination character string that will be obtained by adding the individual character string saved in the RAM 113 in the step S722 to the destination display character string that is saved in the storage 114 exceeds the maximum string length. When the length (the total number of characters) of the temporary destination character string will exceed the maximum string length, the CPU 111 proceeds with the process to step S727. In the step S727, the CPU 111 adds the horizontal ellipsis " . . . " to the end of the destination display character string saved in the storage 114 without saving the individual destination character string saved in the RAM 113. Then, the CPU 111 finishes the process in FIG. 9.

When the length of the temporary destination character string will not exceed the maximum string length, the CPU 111 proceeds with the process to step S724. In step S724, the CPU 111 adds the individual destination character string saved in the RAM 113 to the end of the destination display character string saved in the storage 114. In step S726, the CPU 111 determines whether there is any unprocessed destination about the obtained transmission attribute. When there is an unprocessed destination, the CPU 111 proceeds with the process to step S725. The CPU 111 adds a delimiter "," (comma) to the end of the destination display character string saved in the storage 114 in the step S725 and returns the process to the step S722. The CPU 111 repeats the above process until all the destinations of the destination group are processed. Thereby, the character string of at least one destination of the obtained transmission attribute is recorded in the destination display character string in the storage 114. When there is no unprocessed destination, the CPU 111 finishes the process in FIG. 9.

Thereby, the destination display character string (transmission-record destinations) displayed on each of the transmission record buttons 661, 662, and 663 in the transmission-record selection screen 660 in FIG. 7D is recorded in the storage 114. Then, when displaying the transmission record buttons 661, 662, and 663, the CPU 111 reads the destination display character string from the storage 114 and displays it on the transmission record buttons 661, 662, and 663. The plurality of transmission-record destinations are displayed on the transmission-record selection screen 660 as lists in predetermined formats.

In this way, when the number of destinations of the obtained transmission record is equal to or less than the predetermined number (one in this embodiment) that is the number of destinations that can be displayed in the destination screen on the display unit 121, the CPU 111 as the display controller displays destinations by the first display method. In the first display method, the transmission-record destinations are displayed on the display screen as a list. In the first display method, the CPU 111 displays mail addresses and names of the transmission-record destinations on the display screen as a list according to the address format defined by the RFC (Request For Comments) 2822.

Moreover, the CPU 111 displays destinations on the display screen by the second display method as a list when the number of destinations of the obtained transmission record is more than the predetermined number (i.e., two or more) that is the number of destinations that can be displayed in the destination screen on the display unit 121. In the second display method, each destination of a transmission record is displayed in a more compact style than the first display method. In the second display method, the CPU 111 displays only mail addresses on the display screen as a list in the predetermined format about the destinations, even when mail addresses and names of the destinations have been registered in the transmission record of the e-mail. Moreover, when the transmission attributes about the destinations are obtained in the obtained transmission record of the e-mail, the CPU 111 displays the character strings showing the transmission attributes in association with the transmission-record destinations on the display screen.

Figure 10:
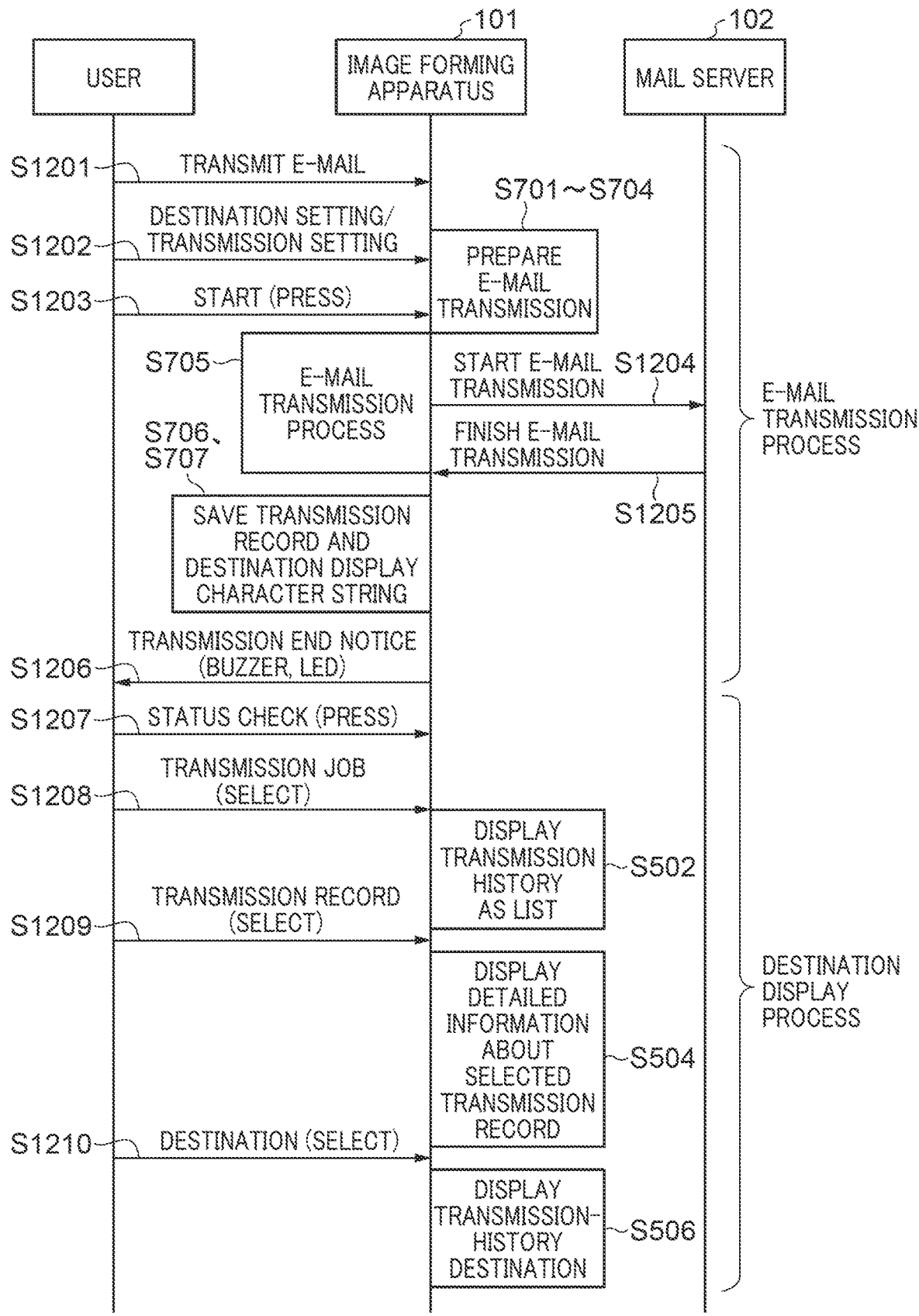
FIG. 10 is an explanatory view showing a communication sequence between the image forming apparatus and a mail server in the e-mail system in the first embodiment.

FIG. 10 is an explanatory view showing a communication sequence between the image forming apparatus 101 and the mail server 103 in the e-mail system 100 in the first embodiment. In FIG. 10, user's operations to the image forming apparatus 101 are also illustrated. When transmitting an e-mail from the image forming apparatus 101, the CPU 111 of the image forming apparatus 101 changes the display screen of the display unit 121 according to a user's operation in step S1201 and displays the e-mail screen 610*a* or 610*b* in FIG. 6 on the display unit 121.

The CPU 111 of the image forming apparatus 101 repeats the process from the step S701 to the step S704 in FIG. 8A according to the destination setting and the transmission setting by the user in step S1202. The CPU 111 of the image forming apparatus 101 starts the e-mail transmitting process in response to a user's start instruction in step S1203. In response to the operation of the monochrome start button 615 or the color start button 614, the CPU 111 of the image forming apparatus 101 reads an image in the step S705, generates an e-mail to which an image file is attached, and transmits the e-mail. For example, the CPU 111 controls the reading unit 116 to read an image of a document according to the transmission setting set in the step S703. The reading unit I/F records the read image data to the RAM 113 or the storage 114.

Next, the CPU 111 converts the read image into the MIME format of e-mail transmission. Next, the CPU 111 generates an e-mail according to the destination setting set in the step S702. The CPU 111 adds the generated image data in the MIME format to the data of the e-mail. Next, the CPU 111 controls the communication I/F 123 to transmit the generated e-mail to the mail server 103 through the network 105 in step S1204.

The communication I/F 123 accesses the mail server 103 by the procedure of the SMTP protocol and transmits the e-mail to the mail server 103. The mail server 103 saves the received e-mail and transmits a response showing that the e-mail transmission has been finished to the communication I/F 123 in step S1205. After finishing transmission of the e-mail, the CPU 111 saves the transmission record (S706) and executes the destination display character string saving process (S707) as e-mail transmission termination processes.

The CPU 111 notifies the user of the transmission end in a transmission end notification step S1206. The CPU 111 notifies the user of the transmission end by turning off an LED, for example. The CPU 111 may notify the user of the transmission end by sounding a buzzer (not shown). The user who knows the transmission end operates the status check button 309 on the home screen 300 in a status check step S1207. Thereby, the CPU 111 displays the status check screen 400 shown in FIG. 4.

When the user selects the transmission job in step S1208, the CPU 111 displays the transmission job check screen 410 shown in FIG. 4 on the display unit 121 by executing the process in the steps S501 and S502. When the user selects the transmission record of one e-mail in step S1209, the CPU 111 displays the detailed information screen 420*a* or 420*b* by executing the process in the steps S503 and S504. When the user selects the destination button 421 or 423 in step S1210, the CPU 111 display the destination screen 430*a* or 430*b* shown in FIG. 4 on the display unit 121 by executing the process in the steps S505 and S506.

As mentioned above, in this embodiment, the CPU 111 of the image forming apparatus 101 generates an e-mail to which image data is attached according to a user's operation and transmits it to the mail server 103. Moreover, the CPU 111 of the image forming apparatus 101 saves a transmission record of a transmitted e-mail etc. and displays a transmission-record destination on the display unit 121 according to a user's operation in the steps S1207 through S1210.

In the destination screen 430*a* displayed when there is one destination, the transmission attribute, name, and mail address are displayed like the destination character string 431. All the destinations of the transmission record are displayed on the display screen of the display unit 121 as a list in the first display method that displays a transmission attribute, name, and mail address. The mail address and name of each destination are displayed in the address format of the RFC2822. A character string showing a transmission attribute is displayed in association with a transmission-record destination. The user easily finds a destination of a transmitted e-mail by referring to a name and mail address.

Moreover, in the destination screen 430*b* displayed when there are two or more destinations, transmission attributes and mail addresses are displayed without displaying names like the destination character string 432. All the destinations of the transmission record are displayed on the display screen of the display unit 121 as a list in the second display method that displays a transmission attribute and mail address while omitting a name and so that the items are displayed in more compact than the first display method. The mail address of each destination is displayed by the format of mail address as-is. A character string showing a transmission attribute is displayed in association with a transmission-record destination. The user easily finds a destination of a transmitted e-mail from a mail address.

Moreover, when the length of the destination display character string exceeds the maximum string length, the horizontal ellipsis " . . . " is added after the last destination on the destination screen 430*b*. The user easily ascertains that there is at least one destination that is not displayed. In this way, in this embodiment, the destination display method is changed so that all the transmission-record destinations can be displayed as much as possible on the display screen as a list on the basis of the size of the destination display area displayed on the display unit 121 and the length of the character string including all the destinations of the obtained transmission record.

Accordingly, in this embodiment, all the destinations of the obtained transmission record are basically displayed on the display screen of the display unit 121 more appropriately. The display of the destinations is excellent in usability. As a result, the display of the transmission-record destinations is improved in this embodiment. This reduces user's misunderstanding of a destination. Possibility of retransmitting a message while the user misunderstands the transmission destinations can be reduced.

Next, an e-mail system 100 including an image forming apparatus 101 according to a second embodiment of the present invention will be described. In the following description, differences from the first embodiment will be mainly described. This embodiment describes a case where the display setting button 435 displayed on the destination screen 430a or 430b in FIG. 4 is operated.

When the display setting button 435 is operated, the CPU 111 as the display setting unit requests a user to set a display form of a destination on the destination screen displayed on the display unit 121. Specifically, change of a setting content is received about each setting item of the transmission-history destination display setting 8000 of Table 1 stored in the storage 114. After that, the CPU 111 displays transmission-record destinations of an e-mail on the display screen as a list on the basis of the changed display settings of Table 1.

FIG. 11A through FIG. 11F are views for showing examples of screens for displaying transmission-record destinations of an e-mail in the second embodiment. The CPU 111 displays destinations of the obtained transmission record on each of transmission-record destination screens shown in FIG. 11A through FIG. 11F as a list in a display form set for each of the first and second display methods according to the display settings of Table 1. Each of the transmission-record destination screens will be described in association with the transmission-record destination display setting 8000 of Table 1.

Figure 11A:
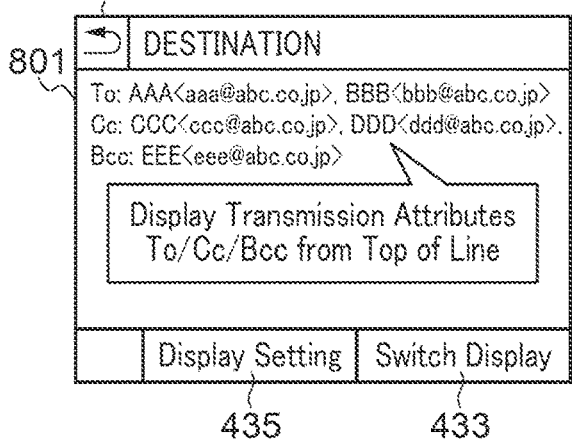
FIG. 11A through FIG. 11F are views for showing examples of a screen for displaying a destination display character string of an e-mail in a second embodiment.

The transmission-record destination screen 801 in FIG. 11A is an example where the display method of transmission attribute (Cc/Bcc) 8001 is set to "Display at Head of Line" and the transmission attribute (To/Cc/Bcc) 8003 is set to "Add". The transmission attributes Cc and Bcc are displayed at the head of lines. Moreover, the Cc destination 8010 and the Bcc destination 8020 are set to "Display", and the TO destination form (broadcast) 8005, Cc destination form 8011, and Bcc destination form 8021 are set to "Name+Address". The character of To destination 8006, character of Cc destination 8013, and character of Bcc destination 8023 are set to "Standard". It should be noted that a plurality of destinations of the same transmission attribute are displayed following the previous destination.

Figure 11D:
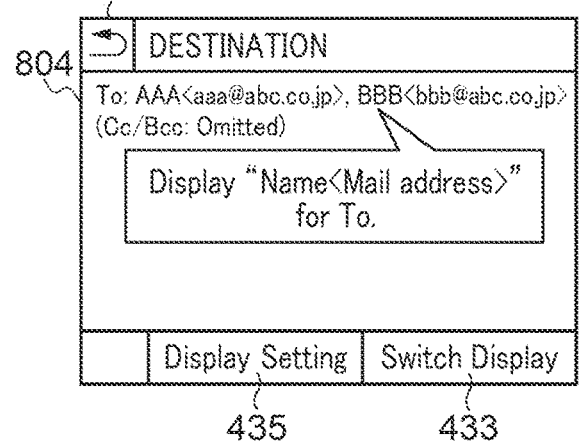
Figure 11B:
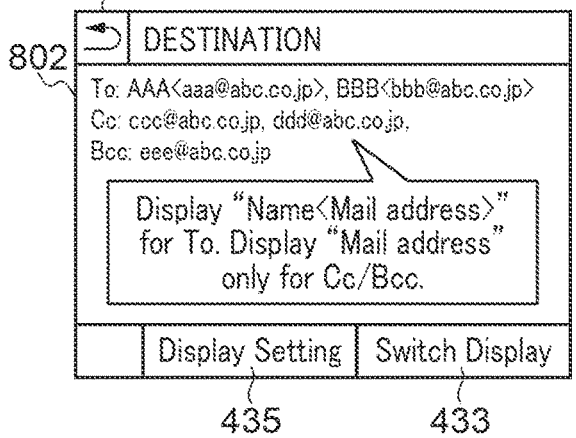
Figure 11E:
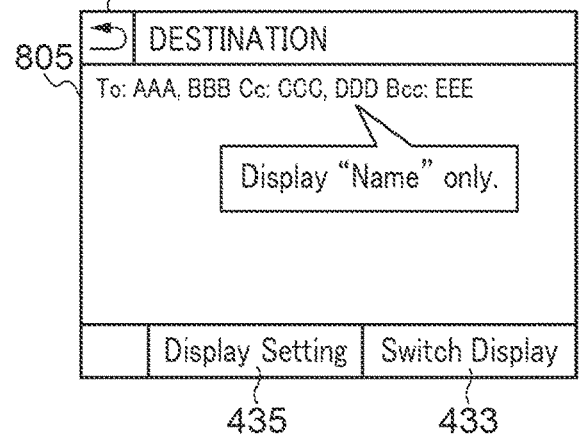

The transmission-record destination screen 802 in FIG. 11B is an example where the Cc destination form 8011 and Bcc destination form 8021 are changed to "Address" from the settings in FIG. 11A. In this case, only the destinations of the transmission attribute To are displayed in the form of "name<address>". The destinations in the transmission attributes Cc and Bcc are displayed in the form of "address".

Figure 11C:
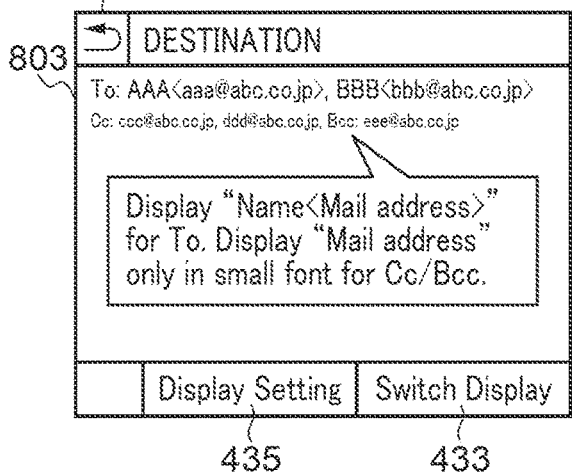

The transmission-record destination screen 803 in FIG. 11C is an example where the display method of transmission attribute (Cc/Bcc) 8001 is changed to "Display Following Previous Destination" and the character of Cc destination 8013 and character of Bcc destination 8023 are changed to "Small Font" from the settings in FIG. 11B. In this case, only the destinations of the transmission attribute To are displayed in the standard character font. The destinations in the transmission attributes Cc and Bcc are displayed in the small character font. The small characters are achieved by embedding a control code that changes the font of characters of a destination into a small font into the destination character string. When the control code is read at the time of displaying a destination, the destination is displayed while changing the display font into the small font.

The transmission-record destination screen 804 in FIG. 11D is an example where the Cc destination 8010 and Bcc destination 8020 are changed to "Not Display" from the settings in FIG. 11A. In this case, only the destinations of the transmission attribute To are displayed. The destinations of the transmission attributes Cc and Bcc are omitted and are not displayed. In this case, a message "(Cc/Bcc omission)" is displayed in the destination screen 804 for showing that there are some hidden destinations of the omitted transmission attributes Cc and Bcc. When only destinations of the transmission attribute Cc are omitted, a message "(Cc omission)" is displayed. When only destinations of the transmission attribute Bcc are omitted, a message "(Bcc omission)" is displayed. Moreover, when there is no destination of an omitted transmission attribute, a message like "(Cc/Bcc omission)" is not displayed.

The transmission-record destination screen 805 in FIG. HE is an example where the display method of transmission attribute (Cc/Bcc) 8001 is changed to "Display Following Former Destination", and the To destination form (broadcast) 8005, Cc destination form 8011, and Bcc destination form 8021 are changed to "Name" from the settings in FIG. 11B. In this case, a destination is shown by a name only.

Figure 11F:
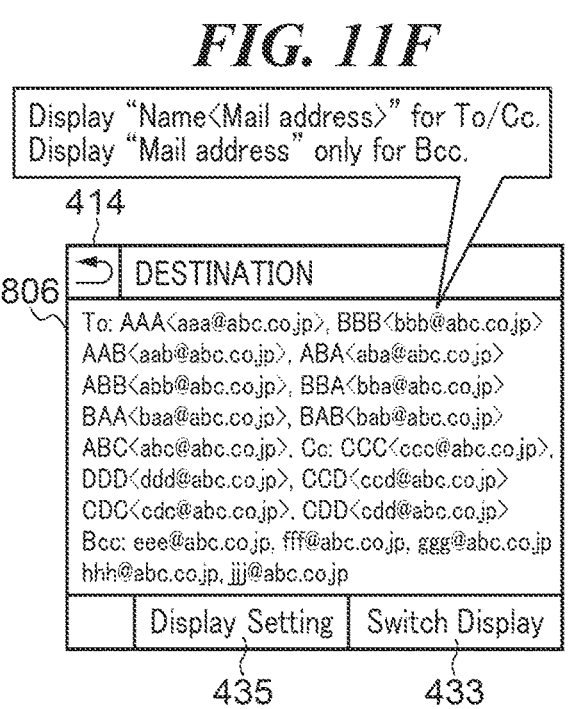

The transmission-record destination screen 806 in FIG. 11F is a display example where the auto-adjustment of destination form To/Cc/Bcc 8030 is set to "Adjust". It is determined whether the destination character string falls within the screen when each destination is displayed in the form of "name<address>" for each of the transmission attributes To/Cc/Bcc. As a result, it is determined that only the destination character string of the transmission attribute Bcc cannot fall within the screen, and the destinations of the transmission attribute Bcc are displayed by the address only.

Moreover, the transmission-record destination screens 801 through 806 in FIG. 11A through FIG. 11F are displayed on the display unit 121 as with the destination screen 430a or 430b in FIG. 4 about the transmission record of the e-mail. The display setting button 435 and display switching button 433 are displayed on the transmission-record destination screens 801 through 806 in FIG. 11A through FIG. 11F.

FIG. 12 is an explanatory view showing an example of the transmission history of e-mails. In FIG. 12, the transmission history of the e-mails is displayed in a list form. When the PC 104 transmits a transmission history display request to a Web server of the image forming apparatus 101, the transmission history is displayed in the list form as a response. Actually, the destination display character strings are displayed on the basis of the settings in the transmission-record destination display setting 8000. However, the destination display character strings 1501 through 1508 shown in FIG. 12 show the display examples based on different display settings for description.

The destination display character string 1501 is an example of the setting where the transmission attribute (To/Cc/Bcc) 8003 is set to "Add". The To destination form (broadcast) 8005, Cc destination form 8011, and Bcc destination form 8021 are set to "Address". Moreover, since the length of the destination display character string exceeds the maximum string length, the horizontal ellipsis " . . . " is added to the end.

The destination display character string 1502 is an example of the setting where the transmission attribute (To/Cc/Bcc) 8003 is set to "Add". The To destination form (broadcast) 8005 is set to "name+address". The destination display character string 1503 is an example of the setting where the transmission attribute (To/Cc/Bcc) 8003 is set to "Add". The To destination form (ordinary) 8004 is set to "name+address". The destination display character string 1504 is an example of the setting where the transmission attribute (To/Cc/Bcc) 8003 is set to "Add". The To destination form (ordinary) 8004 is set to "address".

The destination display character string 1505 is an example of the setting where the transmission attribute (To/Cc/Bcc) 8003 is set to "Not Add". The To destination form (ordinary) 8004 is set to "name+address". The destination display character string 1506 is an example of the setting where the transmission attribute (To/Cc/Bcc) 8003 is set to "Not Add". The To destination form (ordinary) 8004 is set to "address". The total destination character string 1507 is an example of the setting where the transmission attribute (To/Cc/Bcc) 8003 is set to "Add". The To destination form (ordinary) 8004 is set to "Name". The destination display character string 1508 is an example of the setting where the transmission attribute (To/Cc/Bcc) 8003 is set to "Add". The To destination form (broadcast) 8005 is set to "name+address" and the Cc destination form 8011 is set to "Address".

As mentioned above, the destinations can be displayed as a list in a form that a user wants to see by selecting from among the various settings. Furthermore, the transmission-record destination display setting of the list form may be prepared for the destination screens 430a and 430b in the storage 114 in addition to the transmission record destination display setting 8000 so as to enable to display destinations in a form suitable for the list form.

The CPU 111 as the display setting unit sets the display form of a name and mail address of an e-mail destination for each transmission attribute about each of the first and second display methods in this way. In this case, the CPU 111 as the display controller controls the display of a name and mail address of a destination according to the setting for each transmission attribute in each of the first and second display methods.

Moreover, the CPU 111 sets an attribute of using characters as a display form of an e-mail destination for each transmission attribute in each of the first and second display methods. In this case, the CPU 111 as the display controller controls the display of a destination according to the attribute of characters set for each transmission attribute in each of the first and second display methods.

Moreover, the CPU 111 sets presence of display of a transmission attribute as a display form of an e-mail destination. In this case, the CPU 111 as the display controller controls the display of a destination while adding or not adding a transmission attribute according to the setting in each of the first and second display methods. Moreover, the CPU 111 sets display/non-display of a destination itself about the transmission attributes Cc and Bcc as the display form of an e-mail destination. In this case, the CPU 111 as the display controller controls display/non-display of a destination itself according to the setting for each transmission attribute in each of the first and second display methods.

Moreover, the CPU 111 sets whether destinations of different transmission attributes are continuously displayed or a destination of which transmission attribute is different from the previous destination is displayed from a head of a new line as a display form of an e-mail destination. In this case, the CPU 111 as the display controller controls the display of destinations in each of the first and second display methods.

Figure 13:
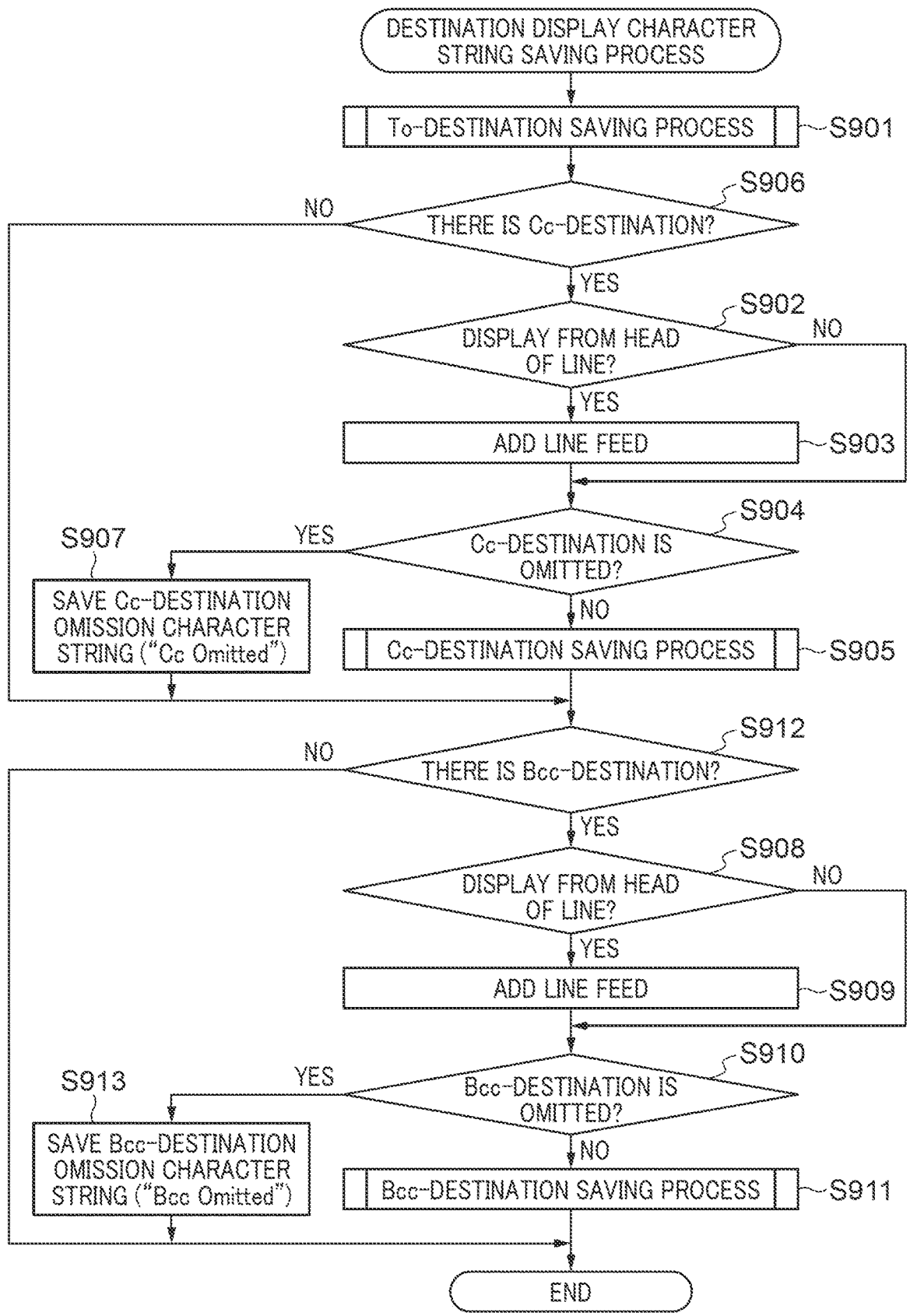
FIG. 13 is a flowchart showing a destination display character string saving process executed by the CPU in FIG. 2 to save transmission-record destinations of an e-mail.

Next, a destination display character string saving process based on the transmission-record destination display setting 8000 in Table 1 will be described. FIG. 13 is a flowchart showing the destination display character string saving process executed by the CPU 111 in FIG. 2. In step S901, the CPU 111 saves destinations of the transmission attribute To as a destination display character string for displaying transmission-record destinations. The destinations are saved according to a flowchart in FIG. 14 on the basis of the destination information about To and the transmission-record destination display setting 8000.

In step S906, the CPU 111 determines whether there is a Cc destination. When there is no Cc destination, the CPU 111 proceeds with the process to step S912. When there is a Cc destination, the CPU 111 proceeds with the process to step S902. In the step S902, the CPU 111 determines whether a line feed code should be added. Specifically, the CPU 111 determines whether a saving start position of a Cc destination matches a head of a line. When the saving start position matches a head of a line, the CPU 111 proceeds with the process to step S904. When the saving start point does not match a head of a line, the CPU 111 determines whether the display method of transmission attribute (Cc/Bcc) 8001 is set to "Display at Head of Line". When the display method of transmission attribute (Cc/Bcc) 8001 is set to "Display at Head of Line", the CPU 111 proceeds with the process to step S903. When the display method of transmission attribute (Cc/Bcc) 8001 is not set to "Display at Head of Line", the CPU 111 proceeds with the process to the step S904.

In the step S903, the CPU 111 adds a line feed code to the end of the destination display character string in order to display the following Cc destination from a head of a new line. After that, the CPU 111 proceeds with the process to the step S904. In the step S904, the CPU 111 determines whether a Cc destination should be omitted on the basis of the setting of the Cc destination 8010. When the Cc destination 8010 is set to "Non-Display" for omitting a Cc destination, the CPU 111 proceeds with the process to step S907. When the Cc destination 8010 is set to "Display" for not omitting a Cc destination, the CPU 111 proceeds with the process to step S905.

In the step S905, the CPU 111 adds destinations of the transmission attribute Cc to the end of the destination display character string. Specifically, a group destination character string of the transmission attribute Cc is added to the transmission-record destination character string. The destinations are saved according to the flowchart in FIG. 14 on the basis of the destination information about Cc and the transmission-record destination display setting 8000. After that, the CPU 111 proceeds with the process to step S912. In step S907, the CPU 111 adds a Cc destination omission character string "(Cc omission)" to the end of the destination display character string in order to notify the user that a Cc destination is omitted.

In step S912, the CPU 111 determines whether there is a Bcc destination. When there is no Bcc destination, the CPU 111 finishes the process in FIG. 13. When there is a Bcc destination, the CPU 111 proceeds with the process to step S908. In the step S908, the CPU 111 determines whether a line feed code should be added. Specifically, the CPU 111 determines whether a saving start position of a Bcc destination matches a head of a line. When the saving start position matches a head of a line, the CPU 111 proceeds with the process to step S910. When the saving start point does not match a head of a line, the CPU 111 determines whether the display method of transmission attribute (Cc/Bcc) 8001 is set to "Display at Head of Line". When the display method of transmission attribute (Cc/Bcc) 8001 is set to "Display at Head of Line", the CPU 111 proceeds with the process to step S909. When the display method of transmission attribute (Cc/Bcc) 8001 is not set to "Display at Head of Line", the CPU 111 proceeds with the process to the step S910.

In the step S909, the CPU 111 adds a line feed code to the end of the destination display character string in order to display the following Bcc destination from a head of a new line. After that, the CPU 111 proceeds with the process to step S910.

In the step S910, the CPU 111 determines whether a Bcc destination should be omitted on the basis of the setting of the Bcc destination 8020. When the Bcc destination 8020 is set to "Non-Display" for omitting a Bcc destination, the CPU 111 proceeds with the process to step S913. When the Bcc destination 8020 is set to "Display" for not omitting a Bcc destination, the CPU 111 proceeds with the process to step S911.

In the step S911, the CPU 111 adds destinations of the transmission attribute Bcc to the end of the destination display character string. The destinations are saved according to the flowchart in FIG. 14 on the basis of the destination information about Bcc and the transmission-record destination display setting 8000. Then, the CPU 111 finishes the process in FIG. 13.

In step S913, the CPU 111 adds a Bcc destination omission character string "(Bcc omission)" to the end of the destination display character string in order to notify the user that a Bcc destination is omitted. In this occurrence, when the "(Cc omission)" has been already saved, the CPU 111 deletes the "(Cc omission)" and adds "(Cc/Bcc omission)". Then, the CPU 111 finishes the process in FIG. 13.

Figure 14:
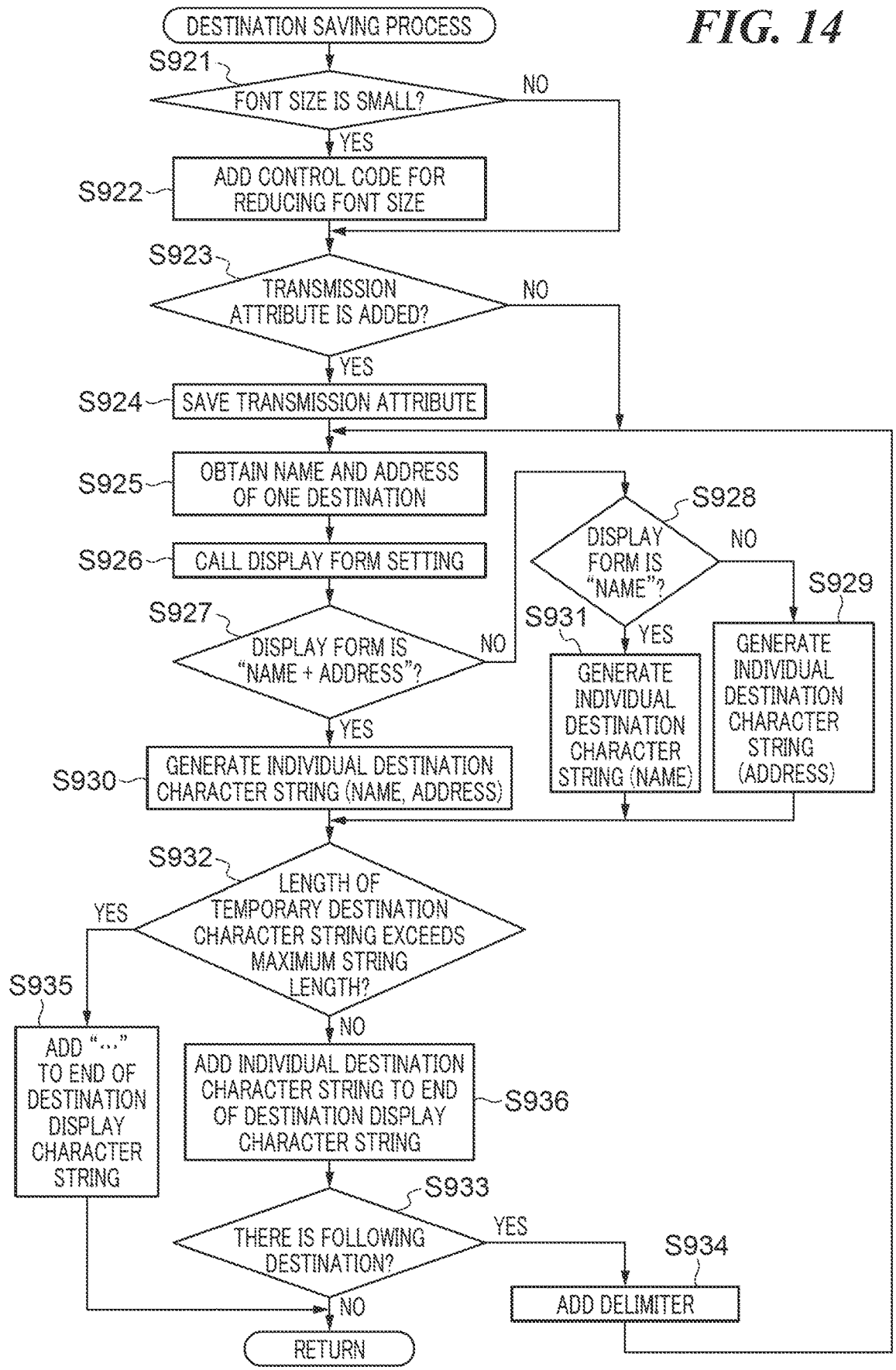
FIG. 14 is a flowchart showing details of a destination saving process in step S901, S905, or S911 in FIG. 13 to save destinations of an e-mail.

FIG. 14 is a flowchart showing details of the destination saving process in step S901, S905, or S911 in FIG. 13 to save destinations of an e-mail. In step S921, the CPU 111 reads the character of To destination 8006, the character of Cc destination 8013, or the character of Bcc destination 8023 from the transmission-record destination display setting 8000 that has been set at the time of saving destinations and determines whether a small font size is set. When the small font size is not set, the CPU 111 proceeds with the process to step S923. When the small font size is set, the CPU 111 proceeds with the process to step S922.

In the step S922, the CPU 111 adds a control code for switching a font size to small size to the end of the destination display character string. In the step S923, the CPU 111 reads the setting of the transmission attribute (To/Cc/Bcc) 8003 and determines whether a transmission attribute should be added. When the transmission attribute is not added, the CPU 111 proceeds with the process to step S925. When the transmission attribute is added, the CPU 111 proceeds with the process to step S924.

In the step S924, the CPU 111 adds the transmission attribute that has been set at the time of saving destinations to the end of the destination display character string. In the step S925, the CPU 111 obtains a name and mail address of one destination from the transmission record that has been set at the time of saving destination.

In step S926, the CPU 111 reads the destination display setting as a setting of an output form that will be determined in the next step on the basis of the transmission attribute and the number of destinations. For example, when the transmission attribute is To and the number of destinations is one, the CPU 111 reads the setting of the To destination form (ordinary) 8004 as the setting of the output form. When the number of To destinations is two or more, the CPU 111 reads the setting of the To destination form (broadcast) 8005 as the setting of the output form. When the transmission attribute is Cc, the CPU 111 reads the setting of the Cc destination form 8011 as the setting of the output form. When the transmission attribute is Bcc, the CPU 111 reads the setting of the Bcc destination form 8021 as the setting of the output form.

In step S927, the CPU 111 determines whether the setting of the read output form is "name+address". When the setting of the read output form is "name+address", the CPU 111 proceeds with the process to step S930. Otherwise, the process proceeds to step S928. In the step S930, the CPU 111 generates an individual destination character string in the format of "name<mail address>" from the name and mail address obtained in the step S925.

In the step S928, the CPU 111 determines whether the setting of the output form is "name". When the read setting of the output form is "name", the CPU 111 proceeds with the process to step S931. Otherwise, the process proceeds to step S929. In the step S929, the CPU 111 generates an individual destination character string in the format of "mail address" from the mail address of the destination obtained in the step S925.

In the step S931, the CPU 111 generates an individual destination character string in the format of "name" from the name obtained in the step S925. In step S932, the CPU 111 determines whether the length of a temporary destination character string that will be obtained by adding the individual character string generated in the step S928, S929, or S930 to the end of the destination display character string will exceed the maximum string length. When the length of the temporary destination character string will exceed the maximum string length, the CPU 111 proceeds with the process to step S935.

In the step S935, the CPU 111 adds the horizontal ellipsis " . . . " to the end of the destination display character string. When the length of the temporary destination character string will not exceed the maximum string length, the CPU 111 proceeds with the process to step S936. In the step S936, the CPU 111 adds the individual destination character string generated in the step S928, S929, or S930 to the end of the destination display character string. After that, the CPU 111 determines whether there is a next destination in step S933. When there is a next destination, the CPU 111 proceeds with the process to step S934.

In the step S934, the CPU 111 adds a comma "," as a delimiter between the destinations to the end of the destination display character string. After that, the CPU 111 returns the process to the step S925. When there is no next destination, the CPU 111 finishes the destination saving process in FIG. 14.

It should be noted that the CPU 111 determines the output form of the name and mail address on the basis of the setting of the transmission-record destination display setting 8000 of Table 1 from the step S927 to the step S931 in FIG. 14. In addition, the CPU 111 may use an apparatus name of a destination, an IP address of a destination, a company name or a department name of a destination, etc. for determining the output form. In this case, the CPU 111 may extend the determination process in the steps S927 and S928 according to determination items. Similarly, the CPU 111 may extend variation of the output form.

Figure 15:
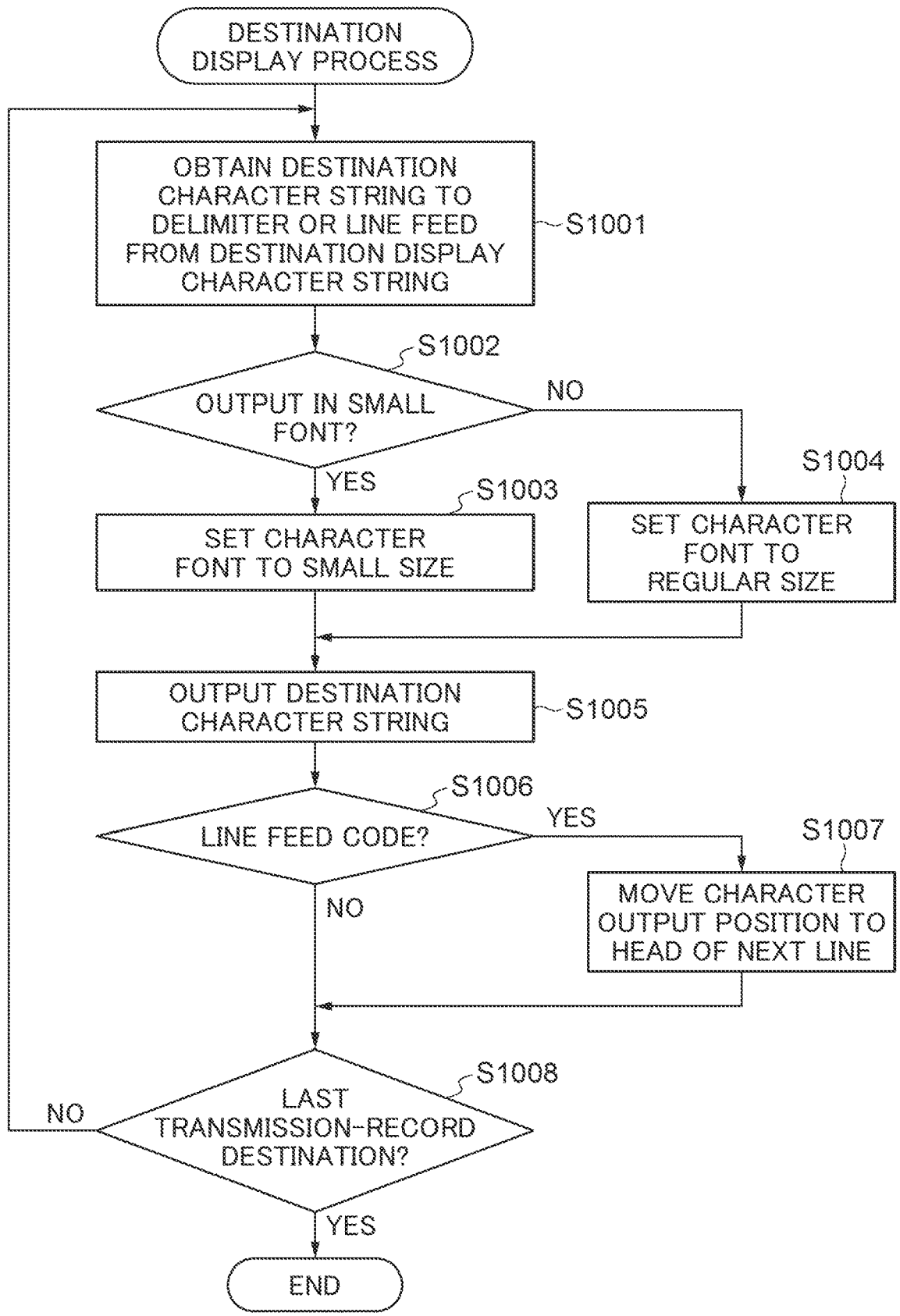
FIG. 15 is a flowchart showing a destination display process for displaying the destination display character string saved through the processes in FIG. 13 and FIG. 14 as transmission destinations of an e-mail.

FIG. 15 is a flowchart showing a destination display process for displaying the destination display character string saved through the processes in FIG. 13 and FIG. 14 as transmission destinations of an e-mail. The CPU 111 in FIG. 2 displays destinations on the display screen on the basis of the transmission-record destination display setting of Table 1 in the destination display process in the step S506 in FIG. 5. Thereby, the various kinds of destination screens shown in FIG. 11A through FIG. 11F are displayed on the display unit 121.

In the step S1001, the CPU 111 obtains a destination character string to the delimiter "," (comma) or to the line feed from the destination display character string. The obtained destination character string includes a transmission attribute, a name and/or a mail address of at least one destination depending on the settings, for example. In step S1002, the CPU 111 determines whether the obtained character string is output in the small font by determining whether the obtained character string includes the control code that switches the font size to the small size. When outputting in the small font, the CPU 111 proceeds with the process to step S1003. When not outputting in the small font, the CPU 111 proceeds with the process to step S1004.

In the step S1003, the CPU 111 sets the setting of a character font to the small size in order to output the obtained character string in the small font. In the step S1004, the CPU 111 sets the setting of the character font to the standard size in order to output the obtained character string in the standard font.

In step S1005, the CPU 111 outputs the destination character string obtained in the step S1001 in the font of the set size. Thereby, the character string that shows one destination is displayed on a destination screen in the font of the set size.

When the length of the destination character string to be displayed exceeds the maximum width of the destination display area, the CPU 111 moves an output start position of the exceeded characters to a head of a new line so as to display all the characters. In step S1006, the CPU 111 determines whether a character following the output character string is the line feed code. When the next character is the line feed code, the CPU 111 proceeds with the process to step S1007.

In the step S1007, the CPU 111 moves the character output position to a head of a new line in the destination display area of the destination screen. When the length of the destination character string matches the width of the destination display area, the process in the step S1007 is not performed because the character output position automatically moves to the new line. When the next character is not the line feed code, the CPU 111 proceeds with the process to the step S1008.

In the step S1008, the CPU 111 determines whether the destination character string obtained in the step S1001 is the last destination of the transmission-record destinations. When the obtained destination character string is not the last destination, the CPU 111 returns the process to the step S1001. When the obtained destination character string is the last destination, the CPU 111 finishes the process in FIG. 15. Thereby, the character string that shows the destination is displayed on the destination screen in the font of the set size.

Figure 16:
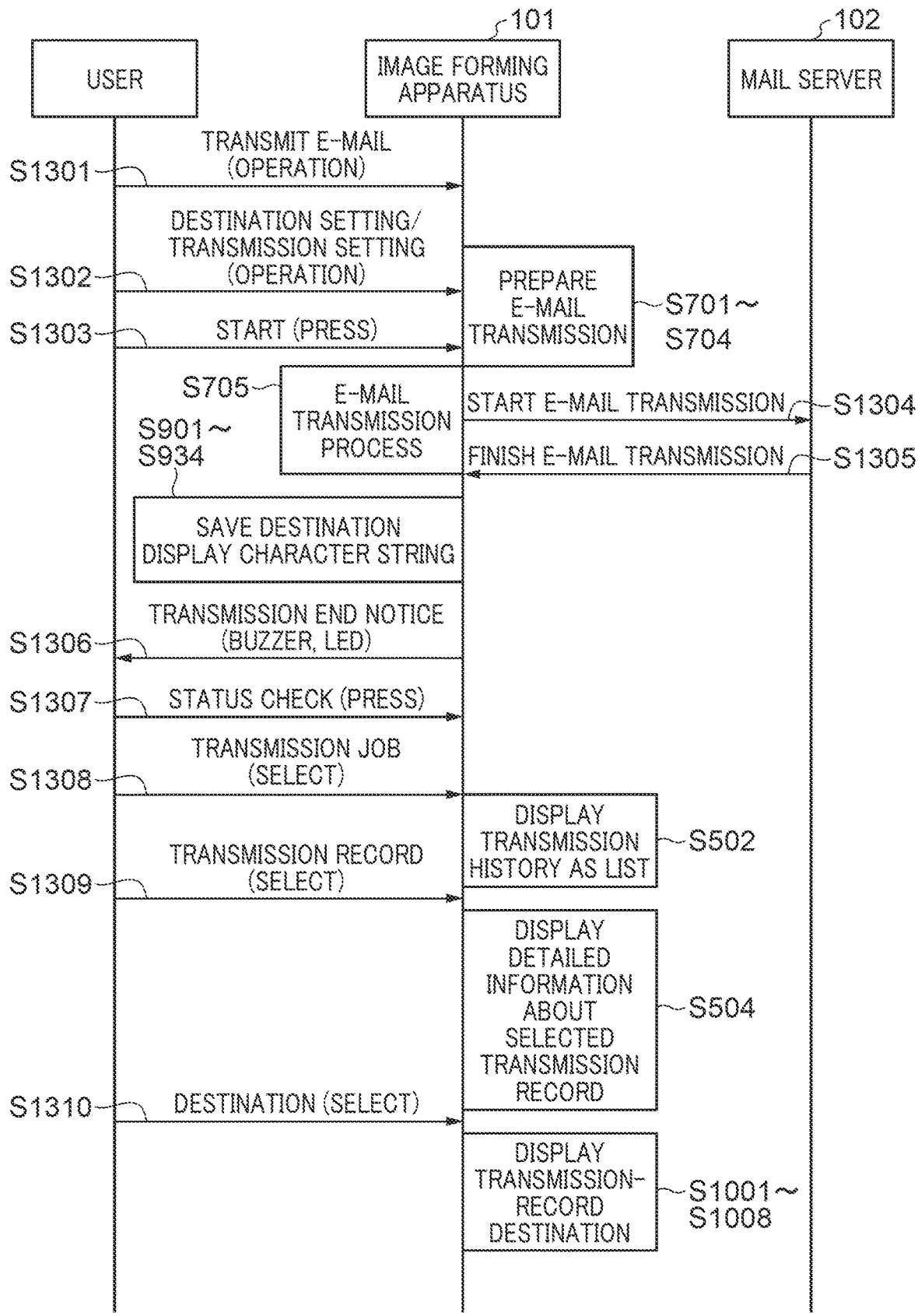
FIG. 16 is an explanatory view showing a communication sequence between the image forming apparatus and the mail server in the e-mail system in the second embodiment.

FIG. 16 is an explanatory view showing a communication sequence between the image forming apparatus 101 and the mail server 103 in the e-mail system 100 in the second embodiment. In FIG. 16, user's operations to the image forming apparatus 101 are also illustrated. Since the processes from the step S1301 to the step S1305 are identical to the processes from the step S1201 to the step S1205 in FIG. 10, their descriptions are omitted.

After transmitting a response of the finish of the e-mail transmission in step S1305, the CPU 111 executes the destination display character string saving process in the steps S901 through S936 as the e-mail transmission termination process. The CPU 111 notifies the user of the transmission end in a transmission end notification step S1306. The CPU 111 notifies the user of the transmission end by turning off an LED, for example. The CPU 111 may notify the user of the transmission end by sounding a buzzer (not shown).

The user who knows the transmission end operates the status check button 309 on the home screen 300 in the status check step S1207. Thereby, the CPU 111 displays the status check screen 400 shown in FIG. 4. When the user selects the transmission job in step S1308, the CPU 111 displays the transmission job check screen 410 shown in FIG. 4 on the display unit 121 by executing the process in the steps S501 and S502.

When the user selects the transmission record of one e-mail in step S1309, the CPU 111 displays the detailed information screen 420a or 420b by executing the process in the steps S503 and S504. When the user selects the destination button in step S1310, the CPU 111 displays the destination screens as shown in FIG. 11A through FIG. 11F on the display unit 121 by executing the process from the step S1001 to the step S1008, for example.

As mentioned above, in the second embodiment, the destination display contents are set for every transmission attribute To/Cc/Bcc on the basis of the transmission-record destination display setting 8000 of Table 1. For example, the user is able to set so that the addresses of the transmission attributes Cc and Bcc will not be displayed, for example. Moreover, when the user wants to display both a name and a mail address, the user is able to set so that both of them will be displayed. Moreover, the user is able to set the size of characters used for display to the small size. This increases the number of characters that can be displayed on the display unit 121, so that all the addresses of the broadcast transmission can be displayed as a list. It should be noted that a color setting of a character may be added to Table 1 so as to change a color of a character in addition to using the small character font.

The display of the transmission-record destination can be customized according to the user's intention by using the transmission-record destination display setting 8000 in this way. When the transmission-record destination display setting is prepared for every transmission destination, the display of the transmission-record destination can be customized according to the user's intention. When the transmission-record destination display setting is prepared for each of the transmission destination setting units (the address book, LDAP server, transmission history, keyboard entry), the display of the transmission-record destination enables to know how the operation is performed to set the transmission-record destination.

Next, an e-mail system 100 including an image forming apparatus 101 according to a third embodiment of the present invention will be described. In the following description, differences from the above-mentioned embodiments will be mainly described. In this embodiment, a case where the display switching button 433 displayed on the destination screen 430a or 430b in FIG. 4 or the destination screen 801, 802, 803, 804, 805, or 806 in FIG. 11A through FIG. 11F is operated will be described.

In this embodiment, the storage 114 or the ROM 112 of the image forming apparatus 101 holds two or more sets of the transmission-record destination display settings shown in Table 1. The storage 114 or the ROM 112 holds a first transmission-history destination display setting and a second transmission-history destination display setting, for example.

When the display switching button 433 is operated, the CPU 111 as the display setting unit switches the display form on the destination screens 430a, 430b, 801 through 806 displayed on the display unit 121. Thereby, the destination screens 430a, 430b, 801 through 806 displayed on the display unit 121 are switched. The destination display setting may be switched from the setting where the destinations of the broadcast transmission are displayed in the form "mail address" like the character string 432 to the setting where the destinations are displayed in the form of "name+mail address" like the destination screen 801.

Figure 17A:
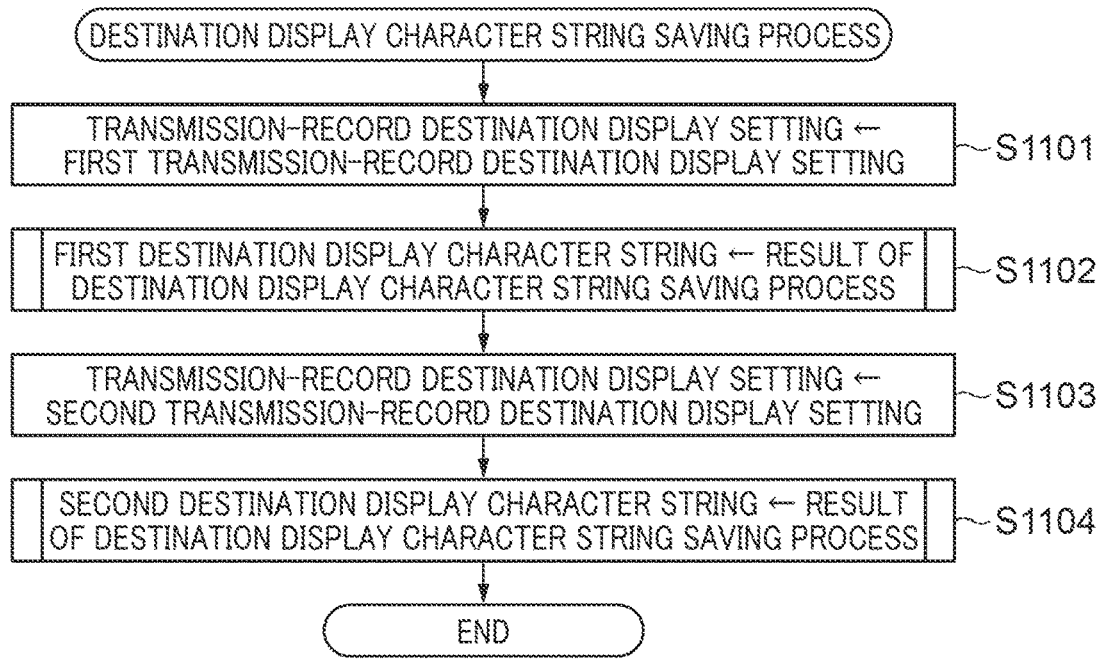
FIG. 17A and FIG. 17B are flowcharts respectively showing a transmission-record destination saving process to save a transmission-record destination of an e-mail and a destination display switching process in a third embodiment.
Figure 17B:
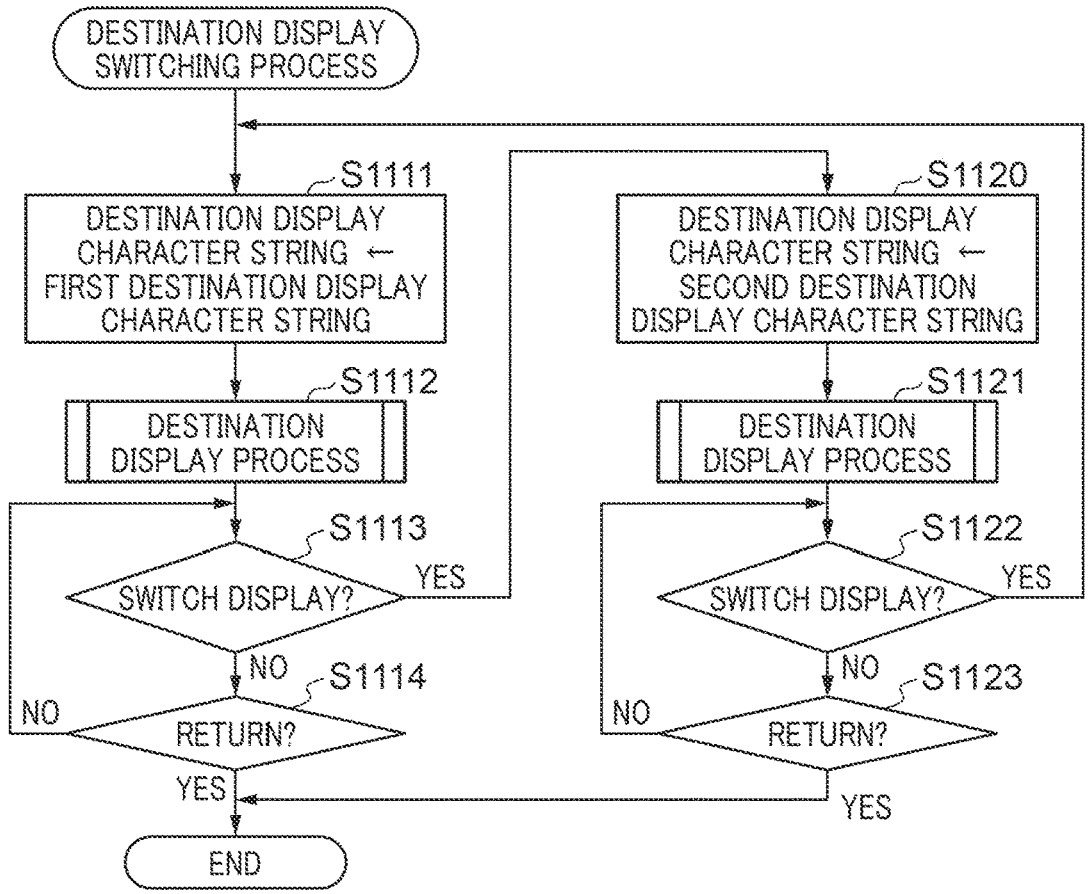

FIG. 17A and FIG. 17B are flowcharts respectively showing a destination display character string saving process to save destinations of an e-mail and a destination display switching process in the third embodiment. FIG. 17A is a flowchart showing the destination display character string saving process at the time of transmitting an e-mail in the step S707 in FIG. 8A. In step S1101, the CPU 111 copies the first transmission-record destination display setting to the transmission-record destination display setting. In step S1102 the CPU 111 executes the destination display character string saving process in FIG. 13. The destination display character string generated is saved as a first destination display character string in the storage 114.

In step S1103, the CPU 111 copies the second transmission-record destination display setting to the transmission-record destination display setting. In step S1104, the CPU 111 executes the destination display character string saving process in FIG. 13. The destination display character string generated is saved as a second destination display character string in the storage 114. As a result of the above-mentioned process, the two destination character strings including the first destination display character string and the second destination display character string are saved in the storage 114.

FIG. 17B is a flowchart showing the destination display switching process that switches the destination display in response to an operation of the display switching button 433. In step S1111, the CPU 111 obtains the first destination display character string and copies it to the destination display character string. In step S1102, the CPU 111 executes the destination display process in FIG. 15. Thereby, the transmission-record destinations are displayed on the display unit 121 in the format on the basis of the first transmission-history destination display setting.

In step S1113, the CPU 111 determines whether the display switching button 433 is operated. When the display switching button 433 is operated, the CPU 111 proceeds with the process to step S1120. When the display switching button 433 is not operated, the CPU 111 proceeds with the process to step S1114.

In the step S1114, the CPU 111 determines whether the back button 414 is operated. When the back button 414 is not operated, the CPU 111 returns the process to the step S1113. When the back button 414 is operated, the CPU 111 finishes the process in FIG. 17B.

After operating the display switching button 433, the CPU 111 obtains the second destination display character string and copies it to the destination display character string in the step S1120. In step S1121, the CPU 111 executes the destination display process in FIG. 15. Thereby, the display of the destination display character string on the display unit 121 is changed to the format based on the second transmission-history destination display setting.

In step S1122, the CPU 111 determines whether the display switching button 433 is operated. When the display switching button 433 is operated, the CPU 111 returns the process to the step S1111. When the display switching button 433 is not operated, the CPU 111 proceeds with the process to step S1123. In the step S1123, the CPU 111 determines whether the back button 414 is operated. When the back button 414 is not operated, the CPU 111 returns the process to the step S1122. When the back button 414 is operated, the CPU 111 finishes the process in FIG. 17B.

Figure 18:
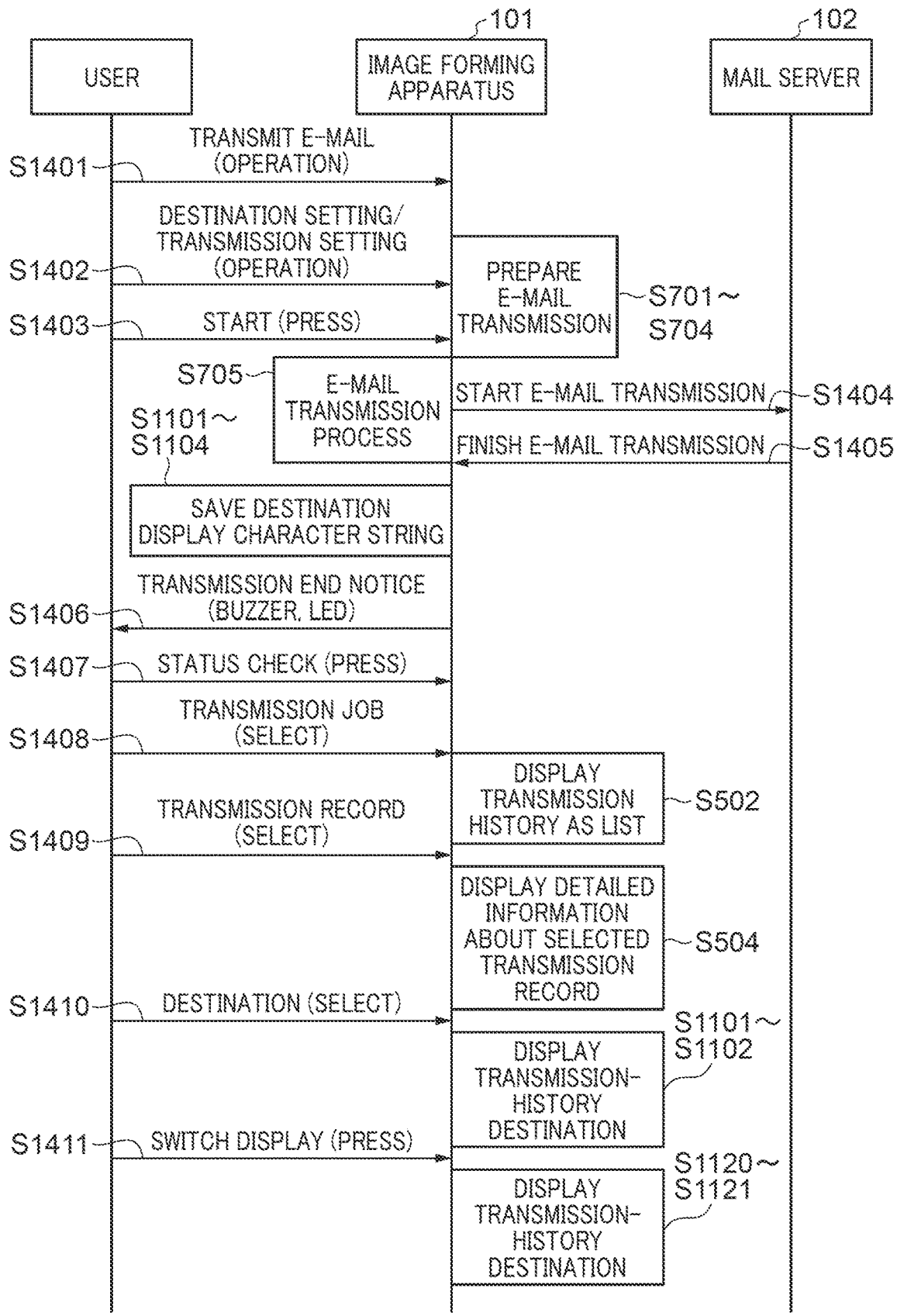
FIG. 18 is an explanatory view showing a communication sequence between the image forming apparatus and the mail server in the e-mail system in the third embodiment.

FIG. 18 is an explanatory view showing a communication sequence between the image forming apparatus 101 and the mail server 103 in the e-mail system 100 in the third embodiment. In FIG. 18, user's operations to the image forming apparatus 101 are also illustrated. Since the processes from the step S1401 to the step S1405 are identical to the processes from the step S1201 to the step S1205 in FIG. 10, their descriptions are omitted.

After transmitting a response of the finish of the e-mail transmission in step S1405, the CPU 111 executes the destination display character string saving process (steps S1101 through S1104) as the e-mail transmission termination process. The CPU 111 notifies the user of the transmission end in a transmission end notification step S1406. The CPU 111 notifies the user of the transmission end by turning off an LED, for example. The CPU 111 may notify the user of the transmission end by sounding a buzzer (not shown).

The user who knows the transmission end operates the status check button 309 on the home screen 300 in the status check step S1407. Thereby, the CPU 111 displays the status check screen 400 shown in FIG. 4. When the user selects the transmission job in step S1408, the CPU 111 displays the transmission job check screen 410 shown in FIG. 4 on the display unit 121 by executing the process in the steps S501 and S502.

When the user selects the transmission record of one e-mail in step S1409, the CPU 111 displays the detailed information screen 420a or 420b by executing the process in the steps S503 and S504. When the user selects the destination button in step S1410, the CPU 111 displays the various destination screens as shown in FIG. HA through FIG. 11F on the display unit 121 by executing the process from the step S1111 to the step S1112.

When the user selects the display switching button 433 in step S1411, the CPU 111 switches the destination screen between the various destination screens and displays it on the display unit 121 by executing the process in the steps S1120 and S1121.

As mentioned above, in this embodiment, the storage 114 records the first destination display character string as the first display setting and the second destination display character string as the second display setting about the transmission record of one e-mail according to the setting by the CPU 111 as the display setting unit. It should be noted that the storage 114 may record three or more destination display character strings.

Moreover, the CPU 111 as the display controller can switch the setting between the plurality of display settings recorded in the storage 114 in each of the first and second display methods. According to this switching, the destination display can be changed from the simple display like the destination screen 805 to the detailed display like the destination screen 801, for example.

Moreover, the user can customize the display of destination according to various statuses. Moreover, the destination display after switching may be stored in the storage 114 in association with the user as the initial destination display of the next time. In this case, the user can switch the destination display and can set the destination display that is finally displayed as the destination display that will be displayed at the next time.

Next, an e-mail system 100 including an image forming apparatus 101 according to a fourth embodiment of the present invention will be described. In the following description, differences from the above-mentioned embodiments will be mainly described.

Figure 19:
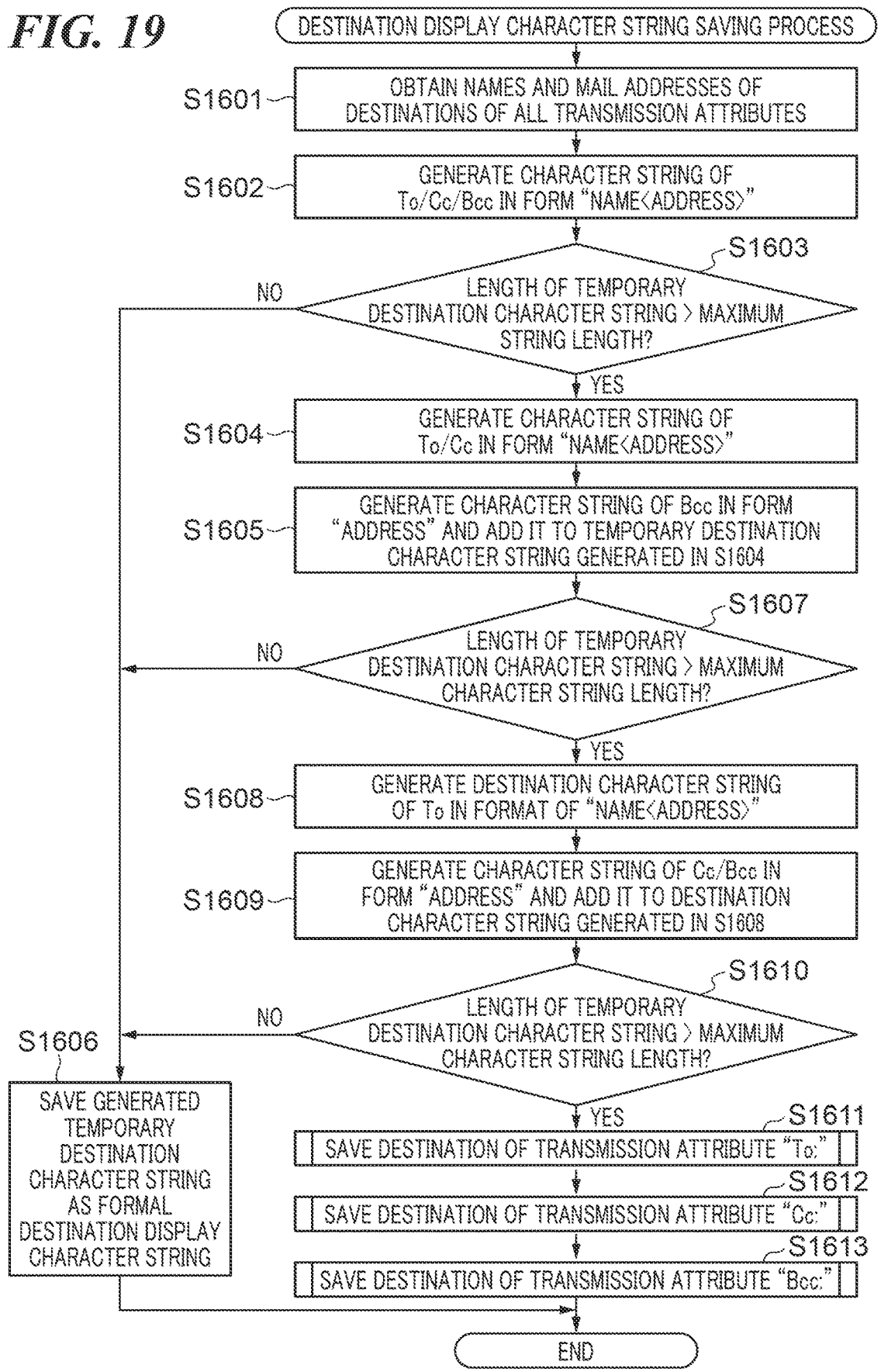
FIG. 19 is a flowchart showing a destination display character string saving process to save a transmission-record destination of an e-mail in a fourth embodiment.

FIG. 19 is a flowchart showing a destination display character string saving process to save a transmission-record destination of an e-mail in the fourth embodiment. FIG. 19 shows the destination display character string saving process executed when the auto-adjustment of destination from (To/Cc/Bcc) 8030 of Table 1 is set to "Adjust". The flowchart in FIG. 19 corresponds to the destination display character string saving process (FIG. 8B) in the first embodiment and to the destination display character string saving process (FIG. 13) of the second embodiment. The e-mail system 100 in this embodiment is achieved by replacing the destination display character string saving process in the previous embodiments with the process in FIG. 19.

In step S1601, the CPU 111 reads names and addresses of destinations of all the transmission attributes (To/Cc/Bcc) from the transmission record of the transmitted e-mail, and saves them in the work area temporarily secured in the RAM 113. In step S1602, the CPU 111 generates a character string for all the destinations including the character strings of the transmission attributes ("To:", "Cc:", "Bcc:") at the beginnings of the destinations of the respective transmission attributes, the destinations in the form of "name<mail address>", and commas as delimiters. The CPU 111 saves the generated character string as a temporary destination character string in the RAM 113 temporarily.

In step S1603, the CPU 111 determines whether the length of the temporary destination character string generated in the step S1602 exceeds the maximum string length that can be saved as the transmission-record destinations. The maximum string length that can be saved as the transmission-record destinations may be equal to or shorter than a predetermined number n of characters that can be displayed on the destination display screen displayed on the display unit 121, for example. When the length of the temporary destination character string does not exceed the maximum string length, the CPU 111 proceeds with the process to step S1606. In the step S1606, the CPU 111 saves the temporary destination character string as a formal destination display character string in the storage 114. Then, the CPU 111 finishes the process in FIG. 19.

When the length of the temporary destination character string exceeds the maximum string length, the CPU 111 proceeds with the process to step S1604. In the step S1604, the CPU 111 generates a character string for the destinations of the transmission attributes To and Cc including the character strings of the transmission attributes ("To:", "Cc:") at the beginnings of the destinations of the respective transmission attributes, the destinations in the form of "name<mail address>", and commas as delimiters. The CPU 111 saves the generated character string as a temporary destination character string in the RAM 113 temporarily.

In step S1605, the CPU 111 generates a character string for the destinations of the transmission attribute Bcc including the character string of the transmission attribute "Bcc:" at the beginning of the destinations, the destinations in the form of "mail address", and commas as delimiters. The CPU 111 adds the generated character string to the temporary destination character string generated in the step S1604. In step S1607, the CPU 111 determines whether the length of the temporary destination character string generated in the step S1605 exceeds the maximum string length that can be saved as the transmission-record destinations. When the length of the temporary destination character string does not exceed the maximum string length, the CPU 111 proceeds with the process to the step S1606.

In the step S1606, the CPU 111 saves the temporary destination character string as the formal destination display character string in the storage 114. Then, the CPU 111 finishes the process in FIG. 19. When the length of the temporary destination character string exceeds the maximum string length, the CPU 111 proceeds with the process to step S1608. In the step S1608, the CPU 111 generates a character string for the destinations of the transmission attribute To including the character string of the transmission attribute ("To:") at the beginning of the destinations, the destinations in the form of "name<mail address>", and commas as delimiters. The CPU 111 saves the generated character string as a temporary destination character string in the RAM 113 temporarily.

In step S1609, the CPU 111 generates a character string for the transmission attributes Cc and Bcc including the character string of the transmission attributes ("Cc:", "Bcc:") at the beginnings of the destinations, the destinations of the transmission attributes Cc and Bcc in the form of "mail address", and commas as delimiters. The CPU 111 adds the generated character string to the temporary destination character string generated in the step S1608.

In step S1610, the CPU 111 determines whether the length of the temporary destination character string generated in the step S1609 exceeds the maximum string length that can be saved as the transmission-record destinations. When the length of the temporary destination character string does not exceed the maximum string length, the CPU 111 proceeds with the process to the step S1606. In the step S1606, the CPU 111 saves the temporary destination character string as a formal destination display character string in the storage 114. Then, the CPU 111 finishes the process in FIG. 19.

When the length of the temporary destination character string exceeds the maximum string length, the CPU 111 proceeds with the process to step S1611. In step S1611, the CPU 111 executes the destination group saving process in FIG. 9 about the transmission attribute To and the destinations of the transmission attribute To. In step S1612, the CPU 111 executes the destination group saving process in FIG. 9 about the transmission attribute Cc and the destinations of the transmission attribute Cc. In step S1613, the CPU 111 executes the destination group saving process in FIG. 9 about the transmission attribute Bcc and the destinations of the transmission attribute Bee. Then, the CPU 111 finishes the process in FIG. 19.

As mentioned above, in this embodiment, the CPU 111 as the display controller automatically generates the display character string so that the more destinations will be displayed in the form of "name<mail address>" in order of decreasing priority To>Cc>Bcc. When the length of the destination display character string for displaying the destinations of the obtained transmission record does not exceed the maximum string length, all the destinations of the transmission record are displayed on the display screen as a list in the form of "name<mail address>" as the first display method.

Moreover, when the length of the destination display character string for displaying the destinations of the obtained transmission record exceeds the maximum string length, the destinations are displayed by the second display method. In the first stage of the second display method, the destinations of the transmission attributes "To" and "Cc" are displayed in the form of "name<mail address>", and the destinations of the transmission attribute "Bcc" are displayed in the form of "mail address". Moreover, when the length of the destination display character length in the first stage of the second display method still exceeds the maximum string length, the destinations of the transmission attribute "To" are displayed in the form of "name<mail address>", and the destinations of the transmission attributes "Cc" and "Bcc" are displayed in the form of "mail address" as the second stage. In the second display method, at least the destinations of the transmission attribute "Bcc" are displayed in the form of "mail address" that is more compact than the form of "name<mail address>" in the first display method.

It should be noted that a process for generating the destination display character string so that the destinations will be displayed in a form of "name" may be added to the destination display character string saving process in FIG. 19. The form of "name" is more compact than the form of "name<mail address>" in the first display method and is equivalent to the second display method. Moreover, the first destination display character string and the second destination display character string may be generated by the destination display character string saving process as with the third embodiment so that one of the two strings will be displayed switchable. Moreover, a destination character string may be generated per one destination not per the transmission attribute by determining whether a destination is displayed in the form of "name<mail address>".

Although the present invention has been described by referring to the preferable embodiments, the present invention is not limited to these specific embodiments, and various configurations that do not deviate from the scope of the present invention are also included in the present invention.

For example, in the first embodiment mentioned above, the transmission attributes To/Cc/Bcc are basically displayed irrespective of the display method when the destinations of the transmission record are displayed. Moreover, the destination of the ordinary transmission is displayed by adding a name to a mail address. Moreover, the destinations of the broadcast transmission are displayed in more compact by omitting names to display more destinations. Accordingly, the destination display of the transmission record enables a user to grasp the destinations easily.

In the second embodiment, the display form of the destination display of the transmission record can be set for every transmission attribute. Accordingly, the destination display of the transmission record can be changed according to a user's intention.

In the third embodiment, a plurality of transmission-record destination display settings are held and the destination display is switchable between the plurality of display forms by switching the settings. In the fourth embodiment, the destinations are basically displayed in the form of "name<mail address>" irrespective of the transmission attributes To/Cc/Bcc when the destinations of the transmission record are displayed. Then, when the length of the destination display character string exceeds the maximum string length, the length of the destinations is reduced in order of decreasing priority To>Cc>Bcc so as not to exceed the maximum string length. In these embodiments, the destination display character string is generated and saved when the transmission is finished, and the character string is read and displayed when the transmission record is displayed.

In addition, for example, all the data of the destinations may be saved when the transmission is finished, and a destination display character string may be generated and displayed when the transmission record is displayed. Moreover, the destination display of the transmission record in the second embodiment may be executed by fixing the transmission attribute, destination form, display font, etc. without providing the display setting used in the first embodiment. Furthermore, the present invention is not limited to the transmission history but is applicable to a case where a transmission status is displayed, a case where destinations are displayed at the time of e-mail transmission, and a case where destinations displayed as the transmission record are output to a display unit.

In the above-mentioned embodiments, the communication job record display device concerning the present invention is described as the image forming apparatus 101. In addition, the communication job record display device may be a computer like the PC 104, a portable information terminal, etc. In such cases, the device may not only transmit an e-mail but also may receive an e-mail. Accordingly, the communication history of e-mails may be a transmission/reception history of e-mails instead of the transmission history of e-mails.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-201955, filed Oct. 26, 2018, which is hereby incorporated by reference herein in its entirety.

What is claimed is:

1. An image processing apparatus that executes a transmission job comprising:
a display device configured to display information;
one or more controllers configured to function as:
a unit configured to obtain record information about the transmission job including destination information; and
a unit configured to cause the display device to display a record display screen based on the record information,
wherein the controller determines a size of a record display screen displayed on the display device,
wherein the record display screen shows the destination information by a combination of a destination name and an e-mail address when the record information meets a first condition, and shows the destination information by the e-mail address and without the destination name when the record information meets a second condition, and
wherein a determination of how to show the destination information is related, in part, to the determined size of the record display screen displayed on the display device.

2. The communication job record display device according to claim 1, wherein the display controller displays at least one destination of the record information obtained on the record display screen by a first display method in a case where a number of destinations is not more than a predetermined number that is the number of destinations that can be displayed on the record display screen, and
wherein the display controller displays destinations of the record information by a second display method that displays each destination in more compact than the first display method in a case where the number of destinations is more than the predetermined number.

3. The communication job record display device according to claim 2, wherein the obtaining unit obtains record information about an e-mail as the record information about the communication job, and obtains a mail address and a name about each destination in the record information about the obtained e-mail, and
wherein the display controller displays the mail address and the name for each destination in the record information in the first display method, and displays the mail address for each destination in the record information in the second display method.

4. The communication job record display device according to claim 3, wherein the display controller displays the mail address and the name on the record display screen in an address format of RFC2822 by the first display method.

5. The communication job record display device according to claim 3, wherein the obtaining unit obtains a transmission attribute about each destination in the record information of the e-mail, and wherein the display controller displays information showing the transmission attribute on the record display screen in association with the destination of the record information.

6. The communication job record display device according to claim 2, further comprising a display setting unit configured to set a display form of a destination in the record display screen for each of the first display method and the second display method, and
wherein the display controller displays destinations of the record information obtained on the record display screen in the display form set by the display setting unit in each of the first display method and the second display method.

7. The communication job record display device according to claim 6, wherein the obtaining unit obtains record information about an e-mail as the record information about the communication job, and
wherein the display setting unit sets a display form of a destination of an e-mail for each of the first display method and the second display method.

8. The communication job record display device according to claim 7, wherein the display setting unit sets a display form of a name and a mail address of a destination of an e-mail for each transmission attribute for each of the first display method and the second display method, and
wherein the display controller controls the display of the name and the mail address of the destination according to the setting for each transmission attribute in each of the first display method and the second display method.

9. The communication job record display device according to claim 7, wherein the display setting unit sets an attribute of characters as the display form of the e-mail destination in each of the first display method and the second display method, and
wherein the display controller controls the display of the destination by an attribute of character set for each transmission attribute in each of the first display method and the second display methods.

10. The communication job record display device according to claim 7, wherein the display setting unit sets presence of display of a transmission attribute as the display form of the e-mail destination for each transmission attribute, and
wherein the display controller controls the display of the destination by adding the transmission attribute based on the setting for each transmission attribute in each of the first display method and the second display method.

11. The communication job record display device according to claim 7, wherein the display setting unit sets presence of display of a destination itself as the display form of the e-mail destination for each transmission attribute, and
wherein the display controller controls the display of the destination itself based on the setting for each transmission attribute in each of the first display method and the second display method.

12. The communication job record display device according to claim 7, wherein the display setting unit sets whether a destination of which transmission attribute is different from the transmission attribute of the previous destination should be displayed from a head of a new line as the display form of the e-mail destination, and
wherein the display controller controls the display of destinations according to the setting for each transmission attribute in each of the first display method and the second display method.

13. The communication job record display device according to claim 7, further comprising a recording unit configured to record a plurality of display settings including a first display setting and a second display setting as settings by the display setting unit, and
wherein the display controller switches between the plurality of display settings recorded by the recording unit in each of the first display method and the second display method.

14. The image processing apparatus according to claim 1, wherein the display controller displays at least one destination of the obtained record information by a first display method in a case where a total number of characters for displaying the at least one destination of the record information is not more than a predetermined number of characters that can be displayed in the record display screen, and
wherein the display controller displays destinations of the record information on the record display screen by a second display method that display each destination in a more compact manner than the first display method in a case where the total number of characters is more than the predetermined number.

15. The image processing apparatus according to claim 1, wherein the combination of the destination name and the e-mail address is information displayed in an address format of RFC2822.

16. The image processing apparatus according to claim 1, wherein the one or more controllers obtain a transmission attribute about each destination in the record information of the e-mail, and wherein the one or more controllers display information showing the transmission attribute on the record display screen in association with the destination of the record information.

17. The image processing apparatus according to claim 1, wherein the one or more controllers set whether a destination of which transmission attribute is different from the transmission attribute of the previous destination should be displayed from a head of a new line as the display form of the e-mail destination.

18. The image processing apparatus according to claim 1, wherein the one or more controllers add a predetermined character to the destination information in a case where all destination information cannot be shown by a predetermined number of characters.

19. A control method for an image processing apparatus that executes a transmission job and having a display device configured to display information, the control method comprising:
an obtaining step of obtaining record information about a transmission job including destination information; and
a display control step of controlling the display device to display a record display screen based on the record information,
wherein the display control step determines a size of a record display screen displayed on the display device,
wherein the record display screen shows the destination information by a combination of a destination name and an e-mail address when the record information meets a first condition, and shows the destination information by the e-mail address and without the destination name when the record information meets a second condition, and
wherein a determination of how to show the destination information is related, in part, to the determined size of the record display screen displayed on the display device.

20. A non-transitory computer-readable storage medium storing a control program causing a computer to execute a control method for an image processing apparatus that executes a transmission job and having a display device configured to display information, the control method comprising:
an obtaining step of obtaining record information about a transmission job including destination information; and
a display control step of controlling the display device to display a record display screen based on the record information,
wherein the display control step determines a size of a record display screen displayed on the display device,
wherein the record display screen shows the destination information by a combination of a destination name and an e-mail address when the record information meets a first condition, and shows the destination information by the e-mail address and without the destination name when the record information meets a second condition, and
wherein a determination of how to show the destination information is related, in part, to the determined size of the record display screen displayed on the display device.

* * * * *